US012809026B2

(12) United States Patent
Behroozpour

(10) Patent No.: US 12,809,026 B2
(45) Date of Patent: Nov. 24, 2026

(54) CONTROL OF SIGNAL CHIRP IN LIDAR SYSTEMS

(71) Applicant: SiLC Technologies, Inc., Monrovia, CA (US)

(72) Inventor: Behnam Behroozpour, South San Francisco, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 300 days.

(21) Appl. No.: 18/631,027

(22) Filed: Apr. 9, 2024

(65) Prior Publication Data

US 2025/0314769 A1 Oct. 9, 2025

(51) Int. Cl.

| | |
|---|---|
| ***G01S 17/34*** | (2020.01) |
| ***G01S 7/481*** | (2006.01) |
| ***G01S 17/26*** | (2020.01) |
| ***G01S 17/42*** | (2006.01) |

(52) U.S. Cl.

CPC ............ *G01S 17/34* (2020.01); *G01S 7/4815* (2013.01); *G01S 7/4817* (2013.01); *G01S 17/26* (2020.01); *G01S 17/42* (2013.01)

(58) Field of Classification Search

CPC ...... G01S 17/34; G01S 7/4811; G01S 7/4915; G01S 17/42; G01S 17/08; G01S 17/32; G01S 17/36; G01S 7/493; G01S 13/345; G01S 13/34

See application file for complete search history.

(56) References Cited

U.S. PATENT DOCUMENTS

| | | | |
|---|---|---|---|
| 10,788,582 | B2 | 9/2020 | Feng et al. |
| 11,262,453 | B2 | 3/2022 | Boloorian et al. |
| 11,353,656 | B1 | 6/2022 | Hu et al. |
| 11,360,213 | B2 | 6/2022 | Asghari et al. |
| 11,378,691 | B2 | 7/2022 | Boloorian et al. |
| 11,378,692 | B2 | 7/2022 | Boloorian et al. |
| 11,381,056 | B2 | 7/2022 | Tavallaee et al. |

(Continued)

FOREIGN PATENT DOCUMENTS

| | | |
|---|---|---|
| WO | 2020/076566 A1 | 4/2020 |
| WO | 2020/160521 A1 | 8/2020 |

(Continued)

*Primary Examiner* — Sanjiv D. Patel

(74) *Attorney, Agent, or Firm* — Gavrilovich, Dodd & Lindsey LLP

(57) ABSTRACT

The LIDAR system includes a light source that outputs an outgoing LIDAR signal. The LIDAR system is configured to transmit a system output signal that includes light from the outgoing LIDAR signal. The LIDAR system includes a light source controller configured to operate the light source such that the outgoing LIDAR signal has a frequency versus time pattern with a control stage and a data stage. The frequency versus time pattern during the data stage has multiple data chirp segments repeated in cycles. The frequency versus time pattern during the control stage has multiple control chirp segments repeated in cycles. Each of the control chirp segments is associated with one of the data chirp segments. A bandwidth of the outgoing LIDAR signal during at least a portion of the control chirp segments each being larger than the bandwidth of the outgoing LIDAR signal during the associated data chirp segment.

20 Claims, 15 Drawing Sheets

(56) References Cited

U.S. PATENT DOCUMENTS

| | | | |
|---|---|---|---|
| 11,385,353 | B2 | 7/2022 | Boloorian et al. |
| 11,402,505 | B2 | 8/2022 | Feng et al. |
| 11,460,642 | B2 | 10/2022 | Hu et al. |
| 11,467,271 | B2 | 10/2022 | Asghari et al. |
| 11,467,289 | B2 | 10/2022 | Boloorian |
| 11,500,071 | B2 | 11/2022 | Asghari et al. |
| 11,500,077 | B2 | 11/2022 | Tavallaee |
| 11,531,090 | B2 | 12/2022 | Feng et al. |
| 11,536,805 | B2 | 12/2022 | Asghari et al. |
| 11,536,837 | B2 | 12/2022 | Boloorian et al. |
| 11,579,305 | B2 | 2/2023 | Asghari et al. |
| 11,581,703 | B2 | 2/2023 | Tavallaee et al. |
| 11,624,807 | B2 | 4/2023 | Luff et al. |
| 11,624,810 | B2 | 4/2023 | Luff et al. |
| 11,624,826 | B2 | 4/2023 | Behroozpour et al. |
| 11,624,943 | B2 | 4/2023 | Luff et al. |
| 11,635,491 | B2 | 4/2023 | Asghari et al. |
| 11,650,317 | B2 | 5/2023 | Boloorian et al. |
| 11,681,021 | B2 | 6/2023 | Asghari et al. |
| 11,698,448 | B1 | 7/2023 | Luff et al. |
| 11,703,598 | B2 | 7/2023 | Luff et al. |
| 11,714,167 | B2 | 8/2023 | Feng et al. |
| 11,714,194 | B2 | 8/2023 | Boloorian et al. |
| 11,714,240 | B2 | 8/2023 | Hu et al. |
| 11,782,134 | B2 | 10/2023 | Asghari et al. |
| 11,782,159 | B2 | 10/2023 | Boloorian |
| 11,789,149 | B2 | 10/2023 | Koonath et al. |
| 11,789,154 | B2 | 10/2023 | Koonath et al. |
| 11,796,651 | B2 | 10/2023 | Luff et al. |
| 11,796,677 | B2 | 10/2023 | Asghari et al. |
| 11,815,720 | B1 | 11/2023 | Tavallaee et al. |
| 11,860,277 | B1 | 1/2024 | Boloorian |
| 11,892,565 | B2 | 2/2024 | Feng et al. |
| 11,940,566 | B2 | 3/2024 | Asghari et al. |
| 11,982,743 | B2 | 5/2024 | Chen et al. |
| 11,982,748 | B2 | 5/2024 | Asghari et al. |
| 12,019,185 | B2 | 6/2024 | Boloorian et al. |
| 12,025,749 | B2 | 7/2024 | Asghari et al. |
| 12,066,535 | B2 | 8/2024 | Behroozpour |
| 12,066,541 | B2 | 8/2024 | Asghari et al. |
| 12,066,577 | B2 | 8/2024 | Tavallaee et al. |
| 12,099,144 | B1 | 9/2024 | Asghari et al. |
| 12,140,712 | B2 | 11/2024 | Koonath et al. |
| 12,140,801 | B2 | 11/2024 | Tavallaee et al. |
| 12,276,728 | B2 | 4/2025 | Koonath et al. |
| 12,306,344 | B1 | 5/2025 | Luff et al. |
| 12,306,350 | B2 | 5/2025 | Asghari et al. |
| 12,339,399 | B2 | 6/2025 | Asghari et al. |
| 12,405,378 | B2 | 9/2025 | Boloorian et al. |
| 12,411,213 | B2 | 9/2025 | Koonath |
| 12,422,618 | B2 | 9/2025 | Sharma et al. |
| 12,429,569 | B2 | 9/2025 | Luff et al. |
| 12,535,586 | B2 | 1/2026 | Boloorian et al. |
| 12,541,009 | B2 | 2/2026 | Asghari et al. |
| 12,553,995 | B2 | 2/2026 | Boloorian |
| 12,578,439 | B2 | 3/2026 | Asghari et al. |
| 12,578,443 | B2 | 3/2026 | Boloorian |
| 12,656,495 | B2 | 6/2026 | Asghari et al. |
| 12,663,516 | B2 | 6/2026 | Warke et al. |
| 2020/0018857 | A1 | 1/2020 | Feng et al. |
| 2020/0200903 | A1* | 6/2020 | Singer .................. B60W 10/04 |
| 2021/0239811 | A1 | 8/2021 | Asghari et al. |
| 2021/0311194 | A1* | 10/2021 | Boloorian ............. G01S 17/894 |
| 2021/0341611 | A1 | 11/2021 | Boloorian |
| 2022/0171048 | A1* | 6/2022 | Kishigami ............ G01S 7/0233 |
| 2022/0317252 | A1 | 10/2022 | Boloorian |
| 2023/0288566 | A1 | 9/2023 | Nadkarni et al. |
| 2024/0012147 | A1 | 1/2024 | Tavallaee et al. |
| 2024/0241312 | A1 | 7/2024 | Asghari |
| 2024/0302508 | A1 | 9/2024 | Asghari et al. |
| 2024/0410988 | A1 | 12/2024 | Asghari et al. |
| 2025/0180716 | A1 | 6/2025 | Behroozpour |
| 2025/0216550 | A1 | 7/2025 | Koonath et al. |
| 2025/0251494 | A1 | 8/2025 | Asghari et al. |
| 2025/0271560 | A1 | 8/2025 | Luff et al. |
| 2025/0291056 | A1 | 9/2025 | Asghari et al. |
| 2026/0016573 | A1 | 1/2026 | Boloorian et al. |
| 2026/0126534 | A1 | 5/2026 | Tavallaee et al. |
| 2026/0177681 | A1 | 6/2026 | Boloorian |

FOREIGN PATENT DOCUMENTS

| | | | | |
|---|---|---|---|---|
| WO | 2022/197388 | A1 | 9/2022 | |
| WO | WO-2023287587 | A1 * | 1/2023 | ............ G01S 17/34 |
| WO | 2023/033964 | A1 | 3/2023 | |
| WO | 2024/059069 | A1 | 3/2024 | |
| WO | 2024/086014 | A1 | 4/2024 | |
| WO | 2024/118222 | A1 | 6/2024 | |
| WO | 2024/163146 | A1 | 8/2024 | |
| WO | 2024/167606 | A1 | 8/2024 | |
| WO | 2024/186705 | A1 | 9/2024 | |
| WO | 2025/010180 | A2 | 1/2025 | |
| WO | 2025/049069 | A2 | 3/2025 | |
| WO | 2025/049079 | A1 | 3/2025 | |
| WO | 2025/090359 | A1 | 5/2025 | |
| WO | 2025/128235 | A1 | 6/2025 | |
| WO | 2025/188433 | A1 | 9/2025 | |
| WO | 2025/193293 | A2 | 9/2025 | |
| WO | 2025/226426 | A1 | 10/2025 | |
| WO | 2025/235260 | A1 | 11/2025 | |
| WO | 2026/039287 | A1 | 2/2026 | |
| WO | 2026/059750 | A1 | 3/2026 | |

* cited by examiner

CONTROL OF SIGNAL CHIRP IN LIDAR SYSTEMS

FIELD

The invention relates to optical devices. In particular, the invention relates to LIDAR systems.

BACKGROUND

There is an increasing commercial demand for LIDAR systems that can be deployed in applications such as ADAS (Advanced Driver Assistance Systems), robotics, and AR (Augmented Reality). LIDAR (Light Detection and Ranging) systems typically output a system output signal that is reflected by an object located outside of the LIDAR system. At least a portion of the reflected light signal returns to the LIDAR system. The LIDAR system directs the received light signal to a light sensor that converts the light signal to an electrical signal. Electronics can use the light sensor output to quantify LIDAR data that indicates the radial velocity and/or distance between the object and the LIDAR system.

Many LIDAR systems chirp the frequency of the system output signal linearly or with other well-defined waveforms versus time to enable the accurate measurement of LIDAR data. In these instances, the LIDAR system can monitor the frequency of the system output signal. In response to the monitored frequency, the LIDAR system can tune the frequency of the system out signal to achieve the desired frequency versus time pattern. The systems used to monitor the frequency of the system output signal can require one or more delay waveguides that are used to create a time delay between a light signal carried in the delay waveguide and a light signal carried in another waveguide. Increasing the length of delay waveguide generally increases the quality of monitoring and tuning the system output signal. However, the length of these delay waveguides often means the delay waveguides occupy an undesirably large percentage of the available space in a LIDAR system. Additionally, the length of these delay waveguides may produce undesirably high levels of signal loss. As a result, the length of the delay waveguide is often reduced to a level where the quality of the chirp of the system output signal drops. As a result, there is a need for an improved system for controlling the frequency chirp of LIDAR system output signals.

SUMMARY

A LIDAR system includes a light source that outputs an outgoing LIDAR signal. The LIDAR system is configured to transmit a system output signal that includes light from the outgoing LIDAR signal. The LIDAR system includes a light source controller configured to operate the light source such that the outgoing LIDAR signal has a frequency versus time pattern with a control stage and a data stage arranged in series. The frequency versus time pattern during the data stage has multiple data chirp segments repeated in cycles. The frequency versus time pattern during the control stage has multiple control chirp segments repeated in cycles. Each of the control chirp segments is associated with one of the data chirp segments. A bandwidth of the outgoing LIDAR signal during at least a portion of the control chirp segments each being larger than the bandwidth of the outgoing LIDAR signal during the associated data chirp segment.

A method of operating a system includes causing a light source in a LIDAR system to output an outgoing LIDAR signal. The LIDAR system is configured to transmit a system output signal that includes light from the outgoing LIDAR signal. The method also includes operating the light source such that the outgoing LIDAR signal has a frequency versus time pattern with a control stage and a data stage. The frequency versus time pattern during the data stage has multiple data chirp segments repeated in cycles. The frequency versus time pattern during the control stage has multiple control chirp segments repeated in second cycles. Each of the control chirp segments is associated with one of the data chirp segments. A bandwidth of the outgoing LIDAR signal during at least a portion of the control chirp segments each being larger than the bandwidth of the outgoing LIDAR signal during the associated data chirp segment.

BRIEF DESCRIPTION OF THE FIGURES

FIG. 6B illustrates an interface between optical components and light sensors that can be positioned on a LIDAR chip.

FIG. 6C is a schematic of an example of a relationship between the electronics and light sensors that can be included on a LIDAR chip.

FIG. 6F is also a graph of a composite error signal over the duration of a frequency chirp where the composite error signal is generated from the illustrated error signals.

DESCRIPTION

A LIDAR system has a light source that outputs an outgoing LIDAR signal. The LIDAR system transmits a system output signal that includes light from the outgoing LIDAR signal. At least a portion of system output signal returns to the LIDAR system after being reflected by an object located outside of the LIDAR system. The outgoing LIDAR signal and the resulting system output signal have a frequency versus time pattern that allows the LIDAR system to use the reflected light to generate LIDAR data for the object. The LIDAR data indicates the radial velocity and/or distance between the object and the LIDAR system.

The LIDAR system includes a light source controller that applies a light source control signal to the light source. The light source control signal is selected to provide the outgoing LIDAR signal with the desired frequency versus time pattern. The frequency versus time pattern of the outgoing LIDAR signal has a sequence of different control chirp segments with the sequence being repeated in cycles. The chirp rate and/or the chirp direction can be different in each of the different control chirp segments within the same cycle.

The frequency versus time pattern that results from application of the light source control signal can be monitored to measure the degree of agreement between the desired pattern and the pattern that is actually achieved. The light source control signal can be tuned in a way that improves the match between the desired pattern and the actual pattern. The quality of the tuning can be increased by increasing the bandwidth of the outgoing LIDAR signal during different chirp segments. However, increasing the bandwidth of the of the outgoing LIDAR signal during chirp segments can make the ability to generate LIDAR data for objects at long distances difficult and/or impractical. As a result, the outgoing LIDAR signal is provided with a frequency versus time pattern having a control stage in series with a data stage. The LIDAR data is generated from the outgoing LIDAR signal in the data stage and the light source control signal is generated from the outgoing LIDAR signal in the control stage. The bandwidth of the outgoing LIDAR signal during the control chirp segments can be higher than the bandwidth of the outgoing LIDAR signal during the data chirp segments. As a result, the light source control signal is generated with the benefits of an outgoing LIDAR signal having an increased chirp bandwidth and generating LIDAR data at longer distance is enabled by an outgoing LIDAR signal having narrower chirp bandwidths.

Figure 1A:
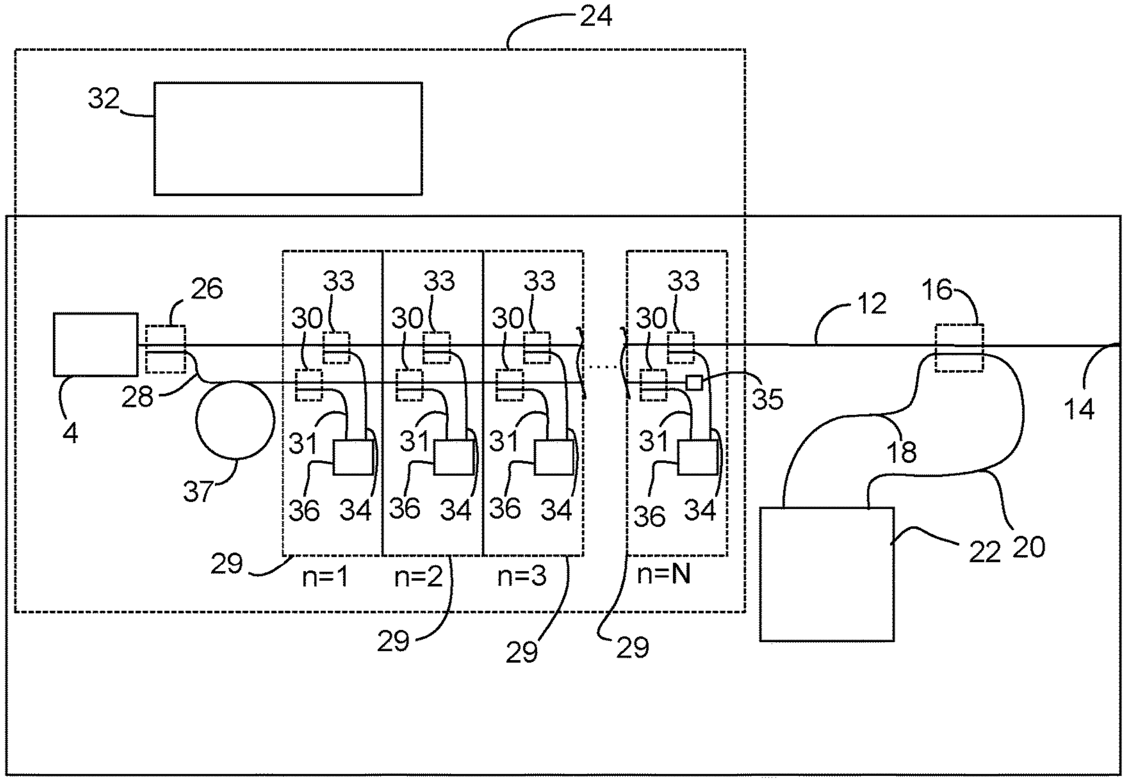
FIG. 1A is a topview of a schematic of a LIDAR system that includes or consists of a LIDAR chip that outputs a LIDAR output signal and receives a LIDAR input signal on a common waveguide.

FIG. 1A is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 terminates at a facet 14 and carries the outgoing LIDAR signal to the facet 14. The facet 14 can be positioned such that the outgoing LIDAR signal traveling through the facet 14 exits the LIDAR chip and serves as a LIDAR output signal. For instance, the facet 14 can be positioned at an edge of the chip so the outgoing LIDAR signal traveling through the facet 14 exits the chip and serves as the LIDAR output signal. In some instances, the portion of the LIDAR output signal that has exited from the LIDAR chip can also be considered a system output signal. As an example, when the exit of the LIDAR output signal from the LIDAR chip is also an exit of the LIDAR output signal from the LIDAR system, the LIDAR output signal can also be considered a system output signal.

The LIDAR output signal travels away from the LIDAR system through free space in the atmosphere and/or environment in which the LIDAR system is positioned. The LIDAR output signal may be reflected by one or more objects in the path of the LIDAR output signal. When the LIDAR output signal is reflected, at least a portion of the reflected light travels back toward the LIDAR chip as a LIDAR input signal. In some instances, the LIDAR input signal can also be considered a system return signal. As an example, when the exit of the LIDAR output signal from the LIDAR chip is also an exit of the LIDAR output signal from the LIDAR system, the LIDAR input signal can also be considered a system return signal.

The LIDAR input signals can enter the utility waveguide 12 through the facet 14. The portion of the LIDAR input signal that enters the utility waveguide 12 serves as an incoming LIDAR signal. The utility waveguide 12 carries the incoming LIDAR signal to a splitter 16 that moves a portion of the outgoing LIDAR signal from the utility waveguide 12 onto a comparative waveguide 18 as a comparative signal. The comparative waveguide 18 carries the comparative signal to a light signal processor 22 for further processing. Although FIG. 1A illustrates a directional coupler operating as the splitter 16, other signal tapping components can be used as the splitter 16. Suitable splitters 16 include, but are not limited to, directional couplers, star couplers, optical couplers, y-junctions, tapered couplers, and Multi-Mode Interference (MMI) devices.

The utility waveguide 12 also carries the outgoing LIDAR signal to the splitter 16. The splitter 16 moves a portion of the outgoing LIDAR signal from the utility waveguide 12 onto a reference waveguide 20 as a reference signal. The reference waveguide 20 carries the reference signal to the light signal processor 22 for further processing.

The percentage of light transferred from the utility waveguide 12 by the splitter 16 can be fixed or substantially fixed. For instance, the splitter 16 can be configured such that the power of the reference signal transferred to the reference waveguide 20 is an outgoing percentage of the power of the outgoing LIDAR signal or such that the power of the comparative signal transferred to the comparative waveguide 18 is an incoming percentage of the power of the incoming LIDAR signal. In many splitters 16, such as directional couplers and multimode interferometers (MMIs), the outgoing percentage is equal or substantially equal to the incoming percentage. In some instances, the outgoing percentage is greater than 30%, 40%, or 49% and/or less than 51%, 60%, or 70% and/or the incoming percentage is greater than 30%, 40%, or 49% and/or less than 51%, 60%, or 70%. A splitter 16 such as a multimode interferometer (MMIs) generally provides an outgoing percentage and an incoming percentage of 50% or about 50%. However, multimode interferometers (MMIs) can be easier to fabricate in platforms such as silicon-on-insulator platforms than some alternatives. In one example, the splitter 16 is a multimode interferometer (MMI) and the outgoing percentage and the incoming percentage are 50% or substantially 50%. As will be described in more detail below, the light signal processor 22 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch 24 for controlling operation of the light source 4. The control branch includes a splitter 26 that moves a portion of the outgoing LIDAR signal from the utility waveguide 12 onto a control waveguide 28. The coupled portion of the outgoing LIDAR signal serves as a tapped signal. Although FIG. 1A illustrates a directional coupler operating as the splitter 26, other signal tapping components can be used as the splitter 26. Suitable splitters 26 include, but are not limited to, directional couplers, optical couplers, star couplers, y-junctions, tapered couplers, and Multi-Mode Interference (MMI) devices.

The control waveguide 28 carries the tapped signal to multiple phase differential generators 29. Each of the phase differential generators 29 is associated with a phase differential generator index n, where n=1 through N. Each of the phase differential generators 29 includes a control splitter 30 that moves a portion of the tapped signal from the control waveguide 28 onto a first waveguide 31. The coupled portion of the tapped signal serves as a first control signal. The first waveguide 31 carries the first control signal to a control signal processor 36. Although FIG. 1A illustrates a directional coupler operating as the control splitter 30, other signal tapping components can be used as the control splitter 30. Suitable control splitters 30 include, but are not limited to, directional couplers, star couplers, optical couplers, y-junctions, tapered couplers, and Multi-Mode Interference (MMI) devices. A suitable number of phase differential generators 29 (N) includes, but is not limited to, a number of phase differential generators 29 greater than or equal to 2, 3, or 5 and less than 6, 8, or 10.

Additionally, the utility waveguide 12 carries the outgoing LIDAR signal to the phase differential generators 29. Each of the phase differential generators 29 includes a utility splitter 33 that moves a portion of the outgoing LIDAR signal from the utility waveguide 12 onto a second waveguide 34. The coupled portion of the outgoing LIDAR signal serves as a second control signal. The second waveguide 34 carries the second control signal to the control signal processor 36. The control signal processor 36 can be in electrical communication with electronics 32 and/or all or a portion of the control signal processor 36 can be included in the electronics 32.

Although FIG. 1A illustrates a directional coupler operating as the utility splitter 33, other signal tapping components can be used as the utility splitter 33. Suitable utility splitters 33 include, but are not limited to, directional couplers, star couplers, optical couplers, y-junctions, tapered couplers, and Multi-Mode Interference (MMI) devices.

The control waveguide 28 can optionally terminate at a signal dump 35 configured to prevent and/or reduce back-reflection of the tapped signal into the control waveguide 28.

Figure 1B:
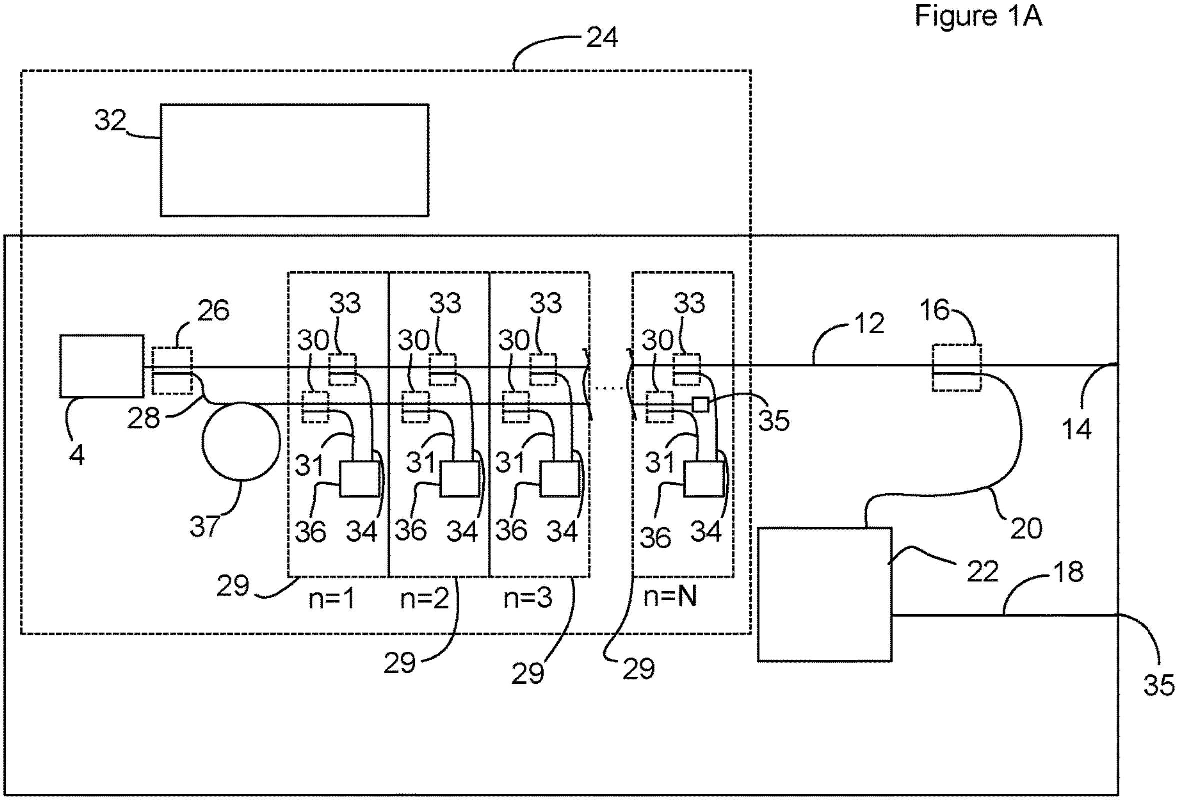
FIG. 1B is a topview of a schematic of a LIDAR system that includes or consists of a LIDAR chip that outputs a LIDAR output signal and receives a LIDAR input signal on different waveguides.

The LIDAR system can be modified so the incoming LIDAR signal and the outgoing LIDAR signal can be carried on different waveguides. For instance, FIG. 1B is a topview of the LIDAR chip of FIG. 1A modified such that the incoming LIDAR signal and the outgoing LIDAR signal are carried on different waveguides. The outgoing LIDAR signal exits the LIDAR chip through the facet 14 and serves as the LIDAR output signal. When light from the LIDAR output signal is reflected by an object external to the LIDAR system, at least a portion of the reflected light returns to the LIDAR chip as a first LIDAR input signal. The first LIDAR input signals enters the comparative waveguide 18 through a facet 35 and serves as the comparative signal. The comparative waveguide 18 carries the comparative signal to a light signal processor 22 for further processing. As described in the context of FIG. 1A, the reference waveguide 20 carries the reference signal to the light signal processor 22 for further processing. As will be described in more detail below, the light signal processor 22 combines the comparative signal with the reference signal to form a composite signal that carries LIDAR data for a sample region on the field of view.

Figure 1C:
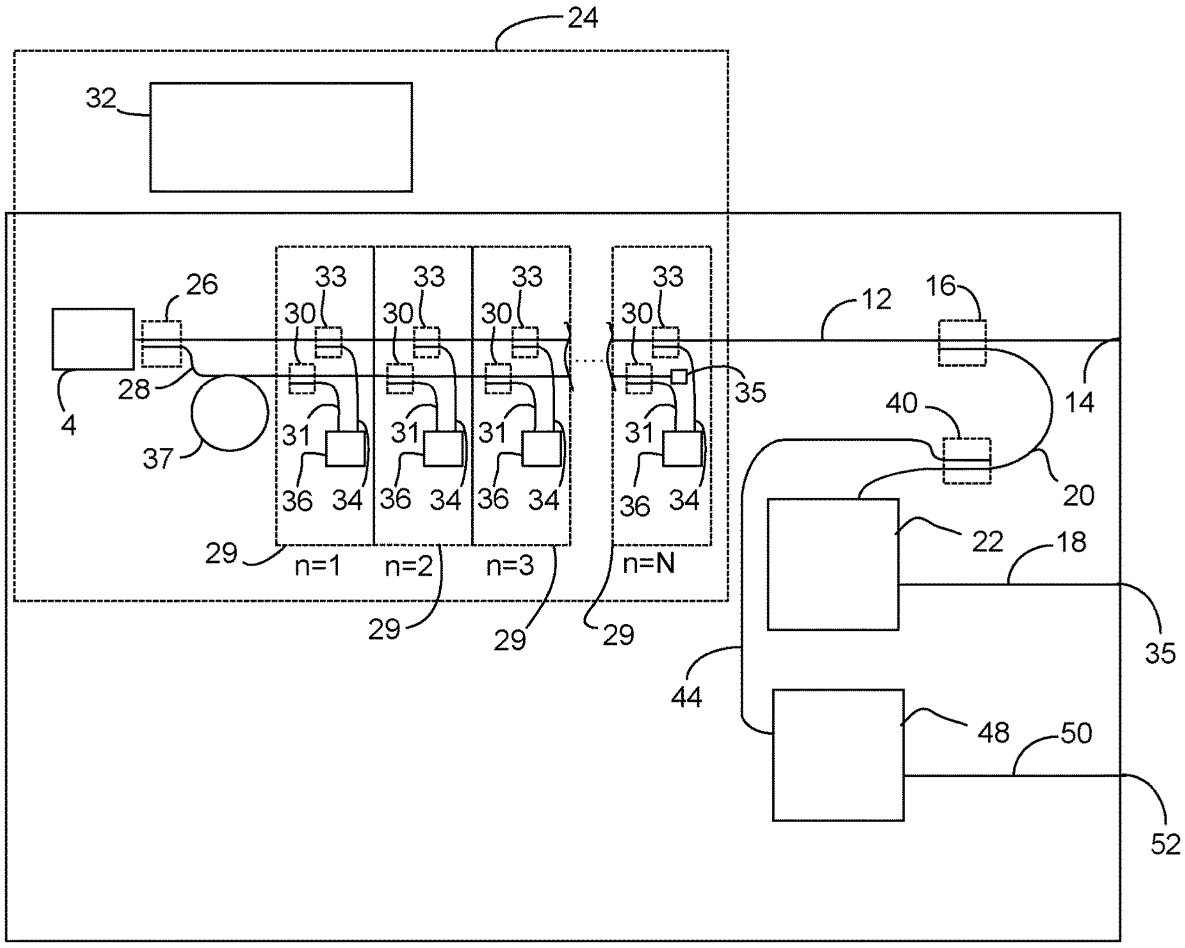
FIG. 1C is a topview of a schematic of another embodiment of a LIDAR system that that includes or consists of a LIDAR chip that outputs a LIDAR output signal and receives multiple LIDAR input signals on different waveguides.

The LIDAR chips can be modified to receive multiple LIDAR input signals. For instance, FIG. 1C illustrates the LIDAR chip of FIG. 1B modified to receive two LIDAR input signals. A splitter 40 is configured to place a portion of the reference signal carried on the reference waveguide 20 on a first reference waveguide 42 and another portion of the reference signal on a second reference waveguide 44. Accordingly, the first reference waveguide 42 carries a first reference signal and the second reference waveguide 44 carries a second reference signal. The first reference waveguide 42 carries the first reference signal to a first light signal processor 46 and the second reference waveguide 44 carries the second reference signal to a second light signal processor 48. Examples of suitable splitters 40 include, but are not limited to, y-junctions, optical couplers, and multi-mode interference couplers (MMIs).

The outgoing LIDAR signal exits the LIDAR chip through the facet 14 and serves as the LIDAR output signal. When light from the LIDAR output signal is reflected by one or more objects located external to the LIDAR system, at least a portion of the reflected light returns to the LIDAR chip as a first LIDAR input signal. The first LIDAR input signals enters the comparative waveguide 18 through the facet 35 and serves as a first comparative signal. The comparative waveguide 18 carries the first comparative signal to a first light signal processor 46 for further processing.

Additionally, when light from the LIDAR output signal is reflected by one or more objects located external to the LIDAR system, at least a portion of the reflected signal returns to the LIDAR chip as a second LIDAR input signal. The second LIDAR input signals enters a second comparative waveguide 50 through a facet 52 and serves as a second comparative signal carried by the second comparative waveguide 50. The second comparative waveguide 50 carries the second comparative signal to a second light signal processor 48 for further processing.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

In some instances, a LIDAR chip constructed according to FIG. 1B or FIG. 1C is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view.

Figure 2:
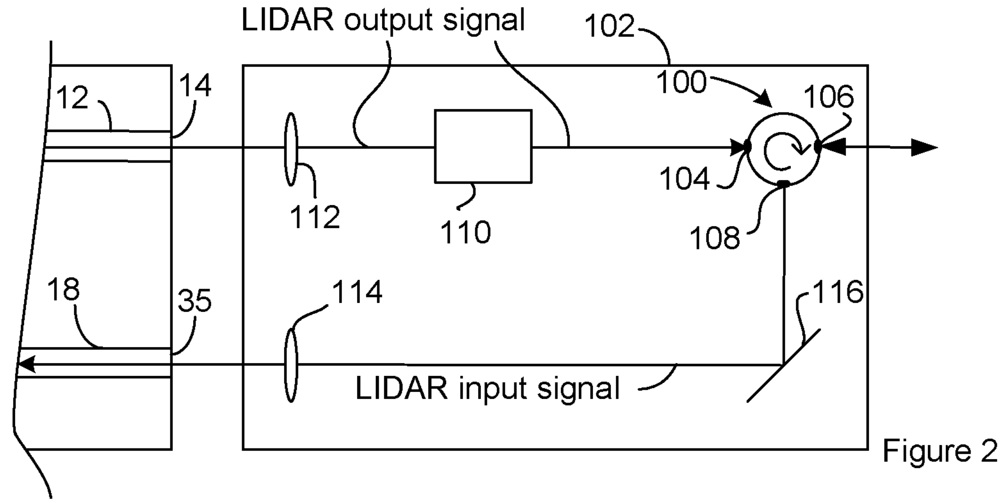
FIG. 2 is a topview of an example of a LIDAR adapter that is suitable for use with the LIDAR chip of FIG. 1B.

An example of a LIDAR adapter that is suitable for use with the LIDAR chip of FIG. 1B is illustrated in FIG. 2. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108 and is directed to the comparative waveguide 18 on the LIDAR chip. Accordingly, all or a portion of the system return signal can serve as the first LIDAR input signal and the first LIDAR input signal includes or consists of light from the system return signal. Accordingly, the LIDAR output signal and the first LIDAR input signal travel between the LIDAR adapter and the LIDAR chip along different optical paths.

As is evident from FIG. 2, the LIDAR adapter can include optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 32 allowing the electronics 32 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to focus the LIDAR output signal on the facet 35 of the comparative waveguide 18.

The LIDAR adapter can also include one or more direction changing components such as mirrors. FIG. 2 illustrates the LIDAR adapter including a mirror as a direction-changing component 116 that redirects the system return signal from the circulator 100 to the facet 20 of the comparative waveguide 18.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
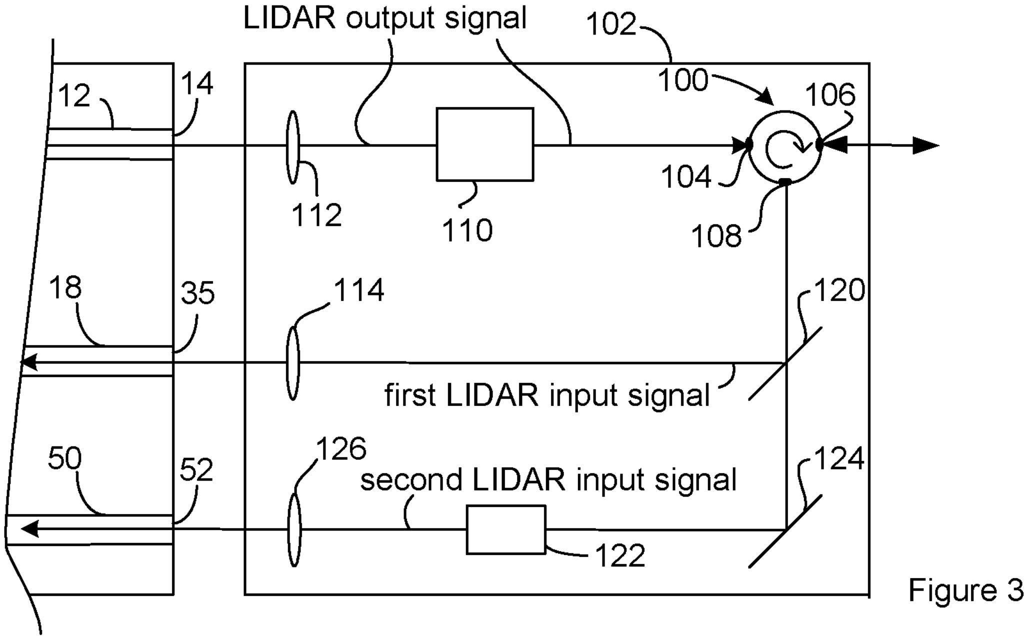
FIG. 3 is a topview of an example of a LIDAR adapter that is suitable for use with the LIDAR chip of FIG. 1C.

FIG. 3 illustrates the LIDAR system of FIG. 3 modified such that the LIDAR adapter is suitable for use with the LIDAR chip of FIG. 1C. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 18 on the LIDAR chip and serves as the first LIDAR input signal described in the context of FIG. 1C. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can be linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 3 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 3, the first comparative signals, the second comparative signals, the first reference signals, and the second reference signals can each have light of the first polarization state.

As a result of the above configuration, first composite signals generated by the first light signal processor 46 and second composite signals generated by the second light signal processor 48 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 3 is described in the context of components being arranged such that the first comparative signals, the second comparative signals, the first reference signals, and the second reference signals each have the first polarization state, other configurations of the components in FIG. 3 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 3 can include additional optical components including passive optical components. For instance, the LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 3 illustrates the LIDAR adapter including a mirror as a direction changing component 124 that redirects the second portion of the system return signal from the circulator 100 to the facet 52 of the second comparative waveguide 50 and/or to the third lens 126.

Figure 4:
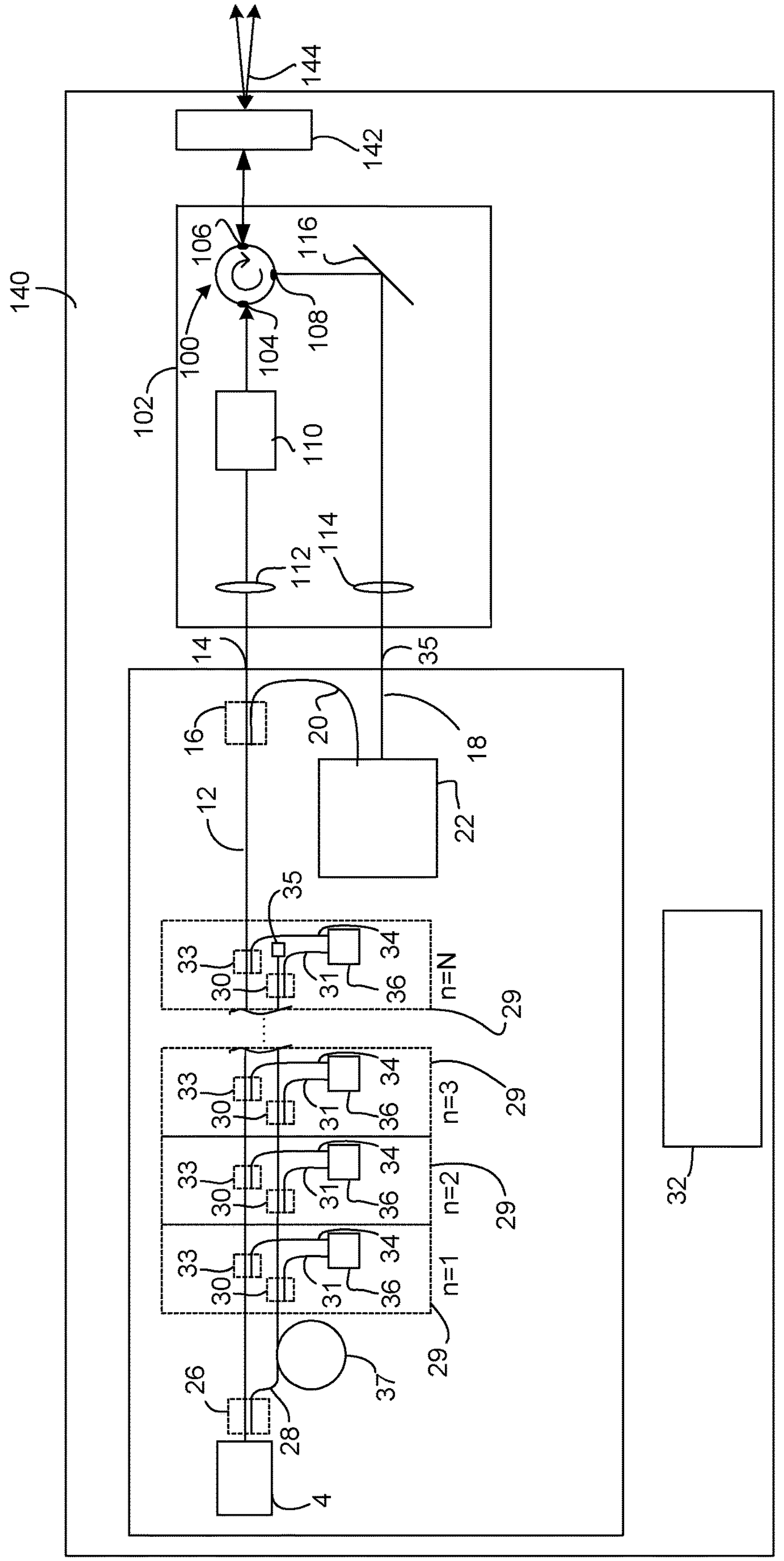
FIG. 4 is a topview of an example of a LIDAR system that includes the LIDAR chip of FIG. 1B and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR system that includes the LIDAR chip and electronics 32 of FIG. 1B and the LIDAR adapter of FIG. 2 on a common support 140. Although the electronics 32 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam scanners that receive the LIDAR output signal from the LIDAR chip or from the LIDAR adapter and that output all or a fraction of the LIDAR output signal that serves as the system output signal. For instance, FIG. 4 illustrates a beam scanner 142 that receives a LIDAR output signal from the LIDAR adapter. Although FIG. 4 shows the beam scanner positioned on the common support 140, the beam scanner can be positioned on the LIDAR chip, on the LIDAR adapter, off the LIDAR chip, or off the common support 140. Suitable beam scanners include, but are not limited to, movable mirrors, MEMS mirrors, optical phased arrays (OPAs), and actuators that move the LIDAR chip, LIDAR adapter, and/or common support.

The electronics can operate the one or more beam scanner 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

Figure 5A:
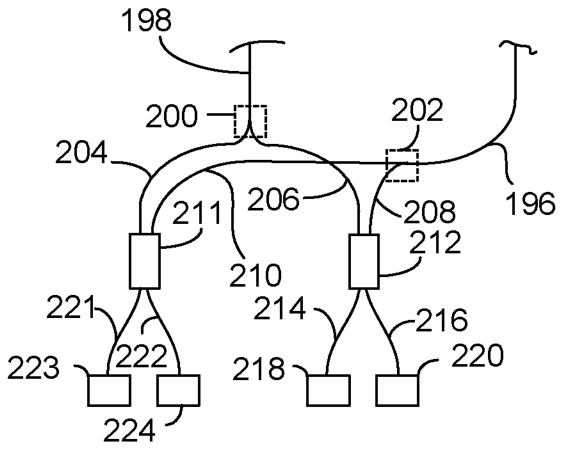
FIG. 5A illustrates an example of a light signal processor suitable for use with the LIDAR systems.
Figure 5B:
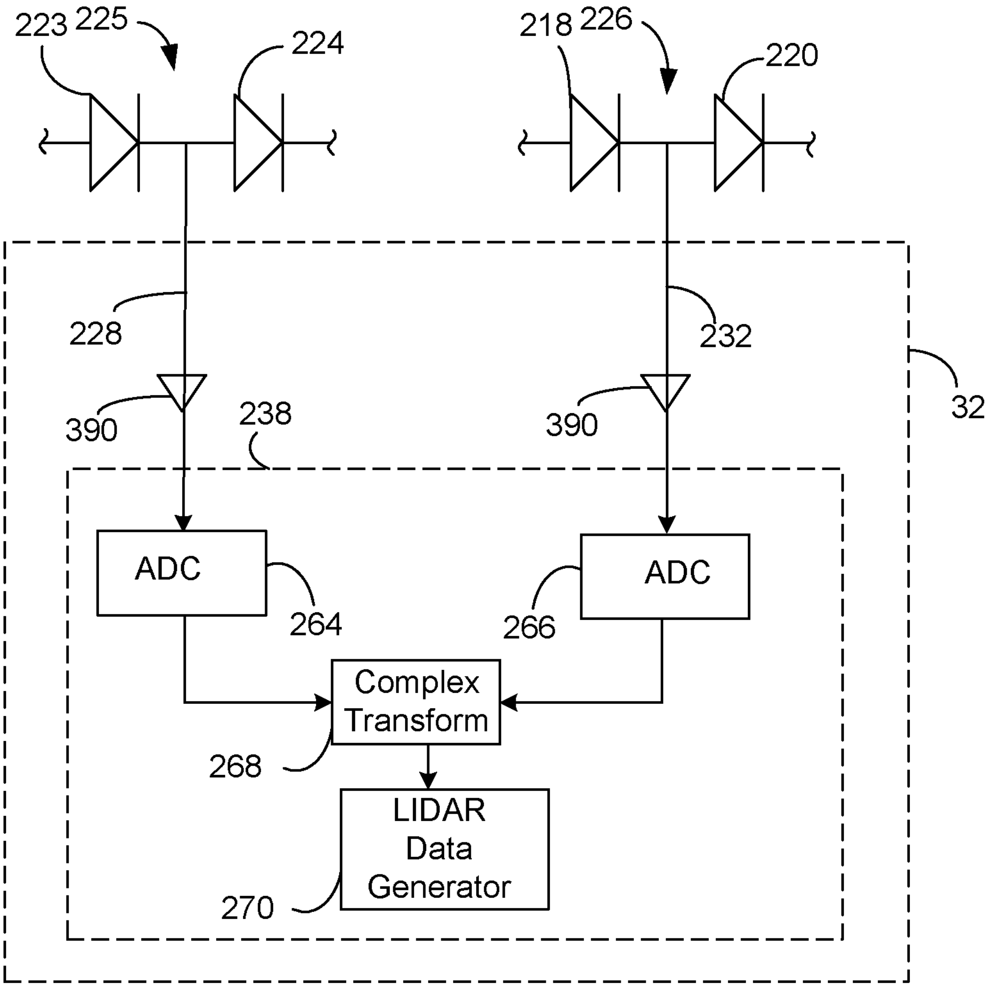
FIG. 5B provides a schematic of electronics that are suitable for use with a light signal processor constructed according to FIG. 5A.
Figure 5C:
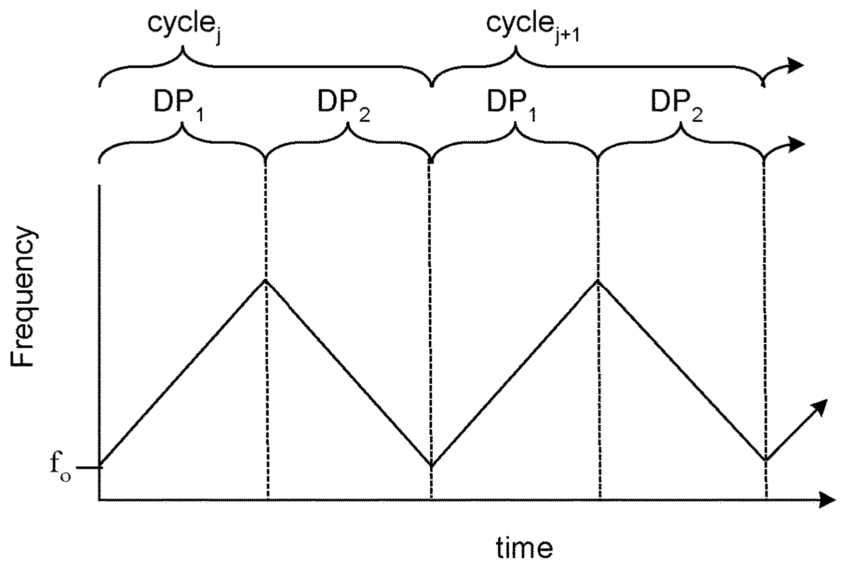
FIG. 5C is a graph of frequency versus time for a system output signal with triangular frequency tuning.

FIG. 5A through FIG. 5C illustrate an example of a suitable light signal processor for use as all or a fraction of the light signal processors selected from the group consisting of the light signal processor 22, the first light signal processor 46 and the second light signal processor 48. The light signal processor receives a comparative signal from a comparative waveguide 196 and a reference signal from a reference waveguide 198. The comparative waveguide 18 and the reference waveguide 20 shown in FIG. 1A and FIG. 1B can serve as the comparative waveguide 196 and the reference waveguide 198, the comparative waveguide 18 and the first reference waveguide 42 shown in FIG. 1C can serve as the comparative waveguide 196 and the reference waveguide 198, or the second comparative waveguide 50 and the second reference waveguide 44 shown in FIG. 1C can serve as the comparative waveguide 196 and the reference waveguide 198.

The light signal processor includes a second splitter 200 that divides the comparative signal carried on the comparative waveguide 196 onto a first comparative waveguide 204 and a second comparative waveguide 206. The first comparative waveguide 204 carries a first portion of the comparative signal to the light signal combiner 211. The second comparative waveguide 208 carries a second portion of the comparative signal to the light signal combiner 212.

The light signal processor includes a first splitter 202 that divides the reference signal carried on the reference waveguide 198 onto a first reference waveguide 204 and a second reference waveguide 206. The first reference waveguide 204 carries a first portion of the reference signal to the light signal combiner 211. The second reference waveguide 208 carries a second portion of the reference signal to the light signal combiner 212.

The light signal combiner 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The light signal combiner 212 also splits the resulting second composite signal onto a first detector waveguide 214 and a second detector waveguide 216. The first detector waveguide 214 carries a first portion of the second composite signal to a first light sensor 218 that converts the first portion of the second composite signal to a first auxiliary electrical signal. The second detector waveguide 216 carries a second portion of the second composite signal to a second light sensor 220 that converts the second portion of the second composite signal to a second auxiliary electrical signal. Examples of suitable light sensors include germanium photodiodes (PDs), and avalanche photodiodes (APDs).

In some instances, the light signal combiner 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the light signal combiner 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light signal combiner 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light signal combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light signal combiner 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light signal combiner 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the light signal combiner 212 splits the second composite signal such that the portion of the comparative signal in the first portion of the second composite signal is phase shifted by 180° relative to the portion of the comparative signal in the second portion of the second composite signal, the light signal combiner 211 also splits the composite signal such that the portion of the comparative signal in the first portion of the composite signal is phase shifted by 180° relative to the portion of the comparative signal in the second portion of the composite signal. When the light signal combiner 212 splits the second composite signal such that the portion of the reference signal in the first portion of the second composite signal is phase shifted by 180° relative to the portion of the reference signal in the second portion of the second composite signal, the light signal combiner 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90-degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first light sensor 218 and the second light sensor 220 can also be connected as a balanced detector. For instance, FIG. 5B provides a schematic of the relationship between the electronics, the first light sensor 223, the second light sensor 224, the first light sensor 218, and the second light sensor 220. The symbol for a photodiode is used to represent the first light sensor 223, the second light sensor 224, the first light sensor 218, and the second light sensor 220 but one or more of these sensors can have other constructions. In some instances, all of the components illustrated in the schematic of FIG. 5B are included on the LIDAR chip. In some instances, the components illustrated in the schematic of FIG. 5B are distributed between the LIDAR chip and electronics located off of the LIDAR chip.

The electronics connect the first light sensor 223 and the second light sensor 224 as a first balanced detector 225 and the first light sensor 218 and the second light sensor 220 as a second balanced detector 226. In particular, the first light sensor 223 and the second light sensor 224 are connected in series. Additionally, the first light sensor 218 and the second light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 32 includes a beat frequency identifier 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The beat frequency identifier 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The beat frequency identifier 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The beat frequency identifier 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of LIDAR input signal relative to the LIDAR output signal that is caused by the radial velocity between the reflecting object and the LIDAR chip.

The beat frequency identifier 238 can include a peak finder (not shown) configured to identify peaks in the output of the transform component 268. The peak finder can be configured to identify any frequency peaks associated with reflection of the system output signal by one or more objects located outside of the LIDAR system. For instance, frequency peaks associated with reflection of the system output signal by one or more objects located outside of the LIDAR system can fall within a frequency range. The peak finder can identify the frequency peak within the range of frequencies associated with the reflection of the system output signal by one or more objects located outside of the LIDAR system. The frequency of the identified frequency peak represents the beat frequency of the composite signal.

The electronics include a LIDAR data generator 270 that receives the beat frequency of the composite signal from the peak finder. The LIDAR data generator 270 processes the beat frequency of the composite signal so as to generate the LIDAR data (distance and/or radial velocity between the reflecting object and the LIDAR chip or LIDAR system). The transform component 268 and/or LIDAR data generator 270 can execute the attributed functions using Field Programmable Gate Arrays (FPGAs), digital signal processors (DSPs), Application Specific Integrated Circuits, firmware, software, hardware, and combinations thereof.

As will be described below, the outgoing LIDAR signal and resulting system output signal can have a frequency versus time pattern with one or more time segments where the frequency versus time pattern is in a data stage and one or more time periods where the where the frequency versus time pattern is in a data stage. FIG. 5C shows an example of a suitable frequency versus time pattern for an outgoing LIDAR signal and a system outputs signal in a data stage. FIG. 5C shows frequency versus time for a sequence of two cycles labeled $cycle_j$ and $cycle_{j+1}$. In some instances, the frequency versus time pattern is repeated in each cycle as shown in FIG. 5C. The illustrated cycles do not include re-location periods and/or re-location periods are not located between cycles. As a result, FIG. 5C illustrates the results for a continuous scan. The base frequency of the system output signal ($f_o$) can be the frequency of the system output signal at the start of a cycle.

Each cycle includes K data chirp segments that are each associated with a period index k and are labeled $DP_k$. In the example of FIG. 5C, each cycle includes two data chirp segments labeled $DP_k$ with k=1 and 2. In some instances, the frequency versus time pattern is the same for the data chirp segments that correspond to each other in different cycles as is shown in FIG. 5C. Corresponding data chirp segments are data chirp segments with the same period index. As a result, each data chirp segment $DP_1$ can be considered corresponding data chirp segments and the associated frequency versus time patterns are the same in FIG. 5C. At the end of a cycle, the electronics return the frequency to the same frequency level at which it started the previous cycle. The desired chirp rate during the data chirp segments can be constant. For instance, the desired frequency for an outgoing LIDAR signal and resulting system output signal can be a linear function of time. However, the actual frequency that results during operation of the LIDAR system may wander away from the desired linear function. The chirp rates in different control chirp segments within each cycle can be different and/or can be in different directions. For instance, during the data chirp segment $DP_1$, and the data chirp segment $DP_2$, the electronics can operate the light source such that the frequency of the system output signal changes as a linear function of time. The direction of the frequency change during the data chirp segment $DP_1$ is the opposite of the direction of the frequency change during the data chirp segment $DP_2$. In some instances, the target rate of frequency change during the data chirp segments data chirp segment $DP_1$ is a constant represented by $\alpha$ and the target rate of frequency change during the data chirp segments data chirp segment $DP_2$ is a constant represented by $-\alpha$.

The frequency output from the Complex Fourier transform represents the beat frequency of the composite signals that each includes a comparative signal beating against a reference signal. The beat frequencies ($f_{LDP}$) from two or more different data chirp segments can be combined to generate the LIDAR data. For instance, the beat frequency determined from $DP_1$ in FIG. 5C can be combined with the beat frequency determined from $DP_2$ in FIG. 5C to determine the LIDAR data. As an example, the following equation applies during a data chirp segment where electronics increase the frequency of the outgoing LIDAR signal during the data chirp segment such as occurs in data chirp segment $DP_1$ of FIG. 5C: $f_{ub}=-f_d+\alpha\tau$ where $f_{ub}$ is the frequency provided by the transform component 268 ($f_{LDP}$ determined from $DP_1$ in this case), $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data chirp segment where electronics decrease the frequency of the outgoing LIDAR signal such as occurs in data chirp segment $DP_2$ of FIG. 5C: $f_{db}=-f_d-\alpha\tau$ where $f_{db}$ is a frequency provided by the transform component 268 ($f_{i,\ LDP}$ determined from $DP_2$ in this case). In these two equations, $f_d$ and $\tau$ are unknowns. The LIDAR data generator 270 can use the solution of these two equations for the two unknowns to calculate the radial velocity for the sample region from the Doppler shift ($v=c*f_d/(2f_c)$) and/or the separation distance for that sample region can be quantified from $c\tau/2$.

In some instances, more than one object is present in a sample region. In some instances when more than one object is present in a sample region, the transform may output more than one frequency where each frequency is associated with a different object. The frequencies that result from the same object in different data chirp segments of the same cycle can be considered corresponding frequency pairs. LIDAR data can be generated for each corresponding frequency pair output by the transform. As a result, separate LIDAR data can be generated for each of the objects in a sample region.

Although FIG. 5A through FIG. 5B illustrate light signal combiners that combine a portion of the reference signal with a portion of the comparative signal, the light signal processor can include a single light signal combiner that combines the reference signal with the comparative signal so as to form a composite signal. As a result, at least a portion of the reference signal and at least a portion of the comparative signal can be combined to form a composite signal. The combined portion of the reference signal can be the entire reference signal or a fraction of the reference signal and the combined portion of the comparative signal can be the entire comparative signal or a fraction of the comparative signal.

Figure 5D:
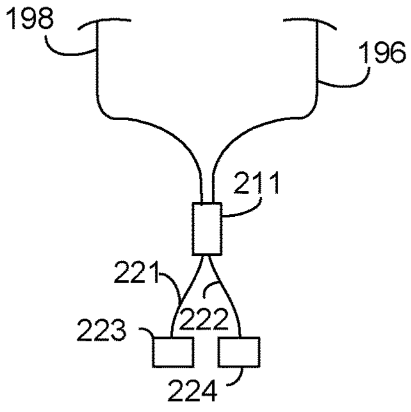
FIG. 5D illustrates another example of a light signal processor suitable for use with the LIDAR systems.
Figure 5E:
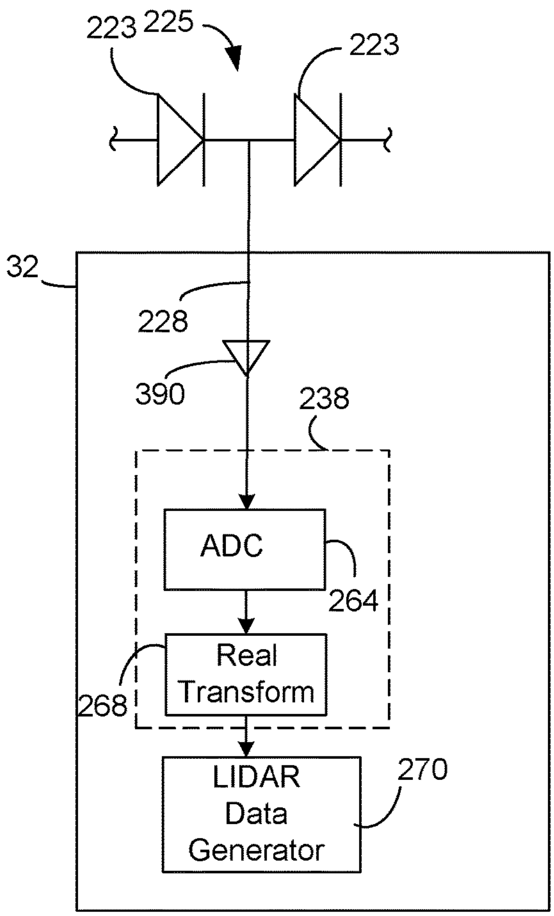
FIG. 5E provides a schematic of electronics that are suitable for use with a light signal processor constructed according to FIG. 5D.

As an example of a light signal processor that combines the reference signal and the comparative signal so as to form a composite signal, FIG. 5D through FIG. 5E illustrate the light signal processor of FIG. 5A through FIG. 5B modified to include a single light signal combiner. The comparative waveguide 196 carries the comparative signal directly to the first light signal combiner 211 and the reference waveguide 198 carries the reference signal directly to the first light signal combiner 211.

The first light signal combiner 211 combines the comparative signal and the reference signal into a composite signal. Due to the difference in frequencies between the comparative signal and the reference signal, the first composite signal is beating between the comparative signal and the reference signal. The first light signal combiner 211 also splits the composite signal onto the first detector waveguide 221 and the second detector waveguide 222. The first detector waveguide 221 carries a first portion of the composite signal to the first light sensor 223 that converts the first portion of the second composite signal to a first electrical signal. The second detector waveguide 222 carries a second portion of the composite signal to the second light sensor 224 that converts the second portion of the second composite signal to a second electrical signal.

FIG. 5E provides a schematic of the relationship between the electronics, the first light sensor 223, and the second light sensor 224. The symbol for a photodiode is used to represent the first light sensor 223, and the second light sensor 224 but one or more of these sensors can have other constructions. In some instances, all of the components illustrated in the schematic of FIG. 5E are included on the LIDAR chip. In some instances, the components illustrated in the schematic of FIG. 5E are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal. The first data signal is an electrical representation of the composite signal.

The electronics 32 include a beat frequency identifier 238 configured to perform a mathematical transform on the first data signal. The mathematical transform can be a real Fourier transform with the first data signal as an input. The beat frequency identifier 238 can include a peak finder (not shown) configured to identify peaks in the output of the beat frequency identifier 268. The peak finder can be configured to identify any frequency peaks associated with reflection of the system output signal by one or more objects located outside of the LIDAR system. For instance, frequency peaks associated with reflection of the system output signal by one or more objects located outside of the LIDAR system can fall within a frequency range. The peak finder can identify the frequency peak within the range of frequencies associated with the reflection of the system output signal by one or more objects located outside of the LIDAR system. The frequency of the identified frequency peak represents the beat frequency of the composite signal.

The electronics include a LIDAR data generator 270 that receives the beat frequency of the composite signal from the peak finder. The LIDAR data generator 270 processes the beat frequency of the composite signal so as to generate the LIDAR data as described above. The transform component 268 and/or LIDAR data generator 270 can execute the attributed functions using Field Programmable Gate Arrays (FPGAs), digital signal processors (DSPs), Application Specific Integrated Circuits, firmware, software, hardware, and combinations thereof.

Each of the balanced detectors disclosed in the context of FIG. 5A through FIG. 5E can be replaced with a single light sensor. As a result, the light signal processor can include one or more light sensors that each receives at least a portion of a composite signal in that the received portion of the composite signal can be the entire composite signal or a fraction of the composite signal.

As discussed in the context of FIG. 5C, the electronics 32 tune the frequency of the system output signal. When the light source 4 is a gain element or laser chip, the electronics 32 can tune the voltage applied to the light source so as modulate the electrical current through the light source. The applied voltage over time can serve as a light source control signal that is selected to achieve the desired frequency versus time pattern in light signals that include light from the outgoing LIDAR signal. The light source can include multiple components. For instance, a light source can include one or more components in addition to a laser. As an example, the light source 4 can include a modulator (not shown) the receives an outgoing LIDAR signal from a laser. The modulator can be configured to modulate the frequency of the outgoing LIDAR signal. As a result, applying a light source control signal to a light source can include applying the light source control signal to a modulator or other component included in the light source. When the light source 4 includes a modulator, the light source controller can apply the light source control signal to the modulator so as to achieve the desired frequency versus time pattern in light signals that include light from the outgoing LIDAR signal. A suitable modulator includes, but is not limited to, a phase modulator. When the light source is or includes a laser cavity, the modulator can be positioned external to the laser cavity along the utility waveguide 12. Alternately, when the light source is or includes a laser cavity such as an external cavity laser (ECL), the modulator can be positioned external within the cavity.

Figure 6A:
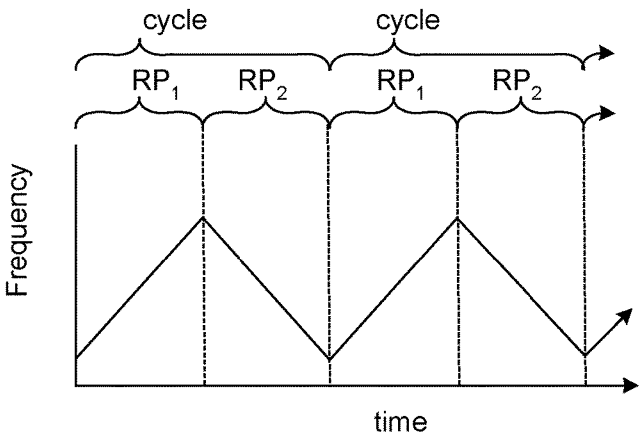
FIG. 6A illustrates an example of a suitable frequency versus time pattern for an outgoing LIDAR signal during a control stage.

As will be described in more detail below, during operation of the phase differential generators, the outgoing LIDAR signal has a frequency versus time pattern in a control stage. FIG. 6A illustrates an example of a suitable frequency versus time pattern for an outgoing LIDAR signal in the control stage. The frequency versus time pattern for the outgoing LIDAR signal and any resulting system output signal, has multiple repeated cycles that each includes multiple different control chirp segments. The desired chirp rate during each control chirp segment can be constant. For instance, the desired frequency for an outgoing LIDAR signal and resulting system output signal can be a linear function of time. However, the actual frequency that results during operation of the LIDAR system may wander away from the desired linear function. The chirp rates in different control chirp segments within a cycle can be different and/or can be in different directions. Each control chirp segment is represented by $RP_k$ where k represents the period index for the data chirp segment associated with the control chirp segment. In FIG. 6A, the duration of each control chirp segment is labeled $RP_k$. Corresponding control chirp segments in different cycles are associated with the same control chirp segment index. Since the control signal and the second control signal include light from the outgoing LIDAR signal, the control signal and the second control signal also have the frequency versus time pattern of the control stage.

Figure 6B:
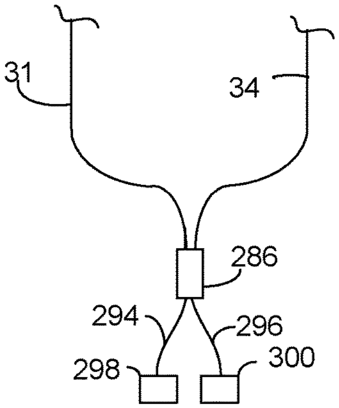
FIG. 6B and FIG. 6C illustrate an example of a suitable control signal processor for use as all or a fraction of the control signal processors disclosed in the context of FIG. 1A through FIG. 1C.

FIG. 6B illustrates construction of a portion of a suitable phase differential generator for use as all or a fraction of the phase differential generators 29 disclosed in the context of FIG. 1A through FIG. 1C and FIG. 4. As noted above, the first waveguide 31 carries the first control signal to a control signal processor 36 and the second waveguide 34 carries the second control signal to the control signal processor 36. The control signal processor 36 includes a light signal combiner 286. The light signal combiner 286 combines the first control signal and the second control signal into a beating control signal. The phase difference between the contribution of the first control signal to the beating control signal and the contribution of the second control signal to the beating control signal is different for different phase differential generators 29. For instance, the contribution of the first control signal to the beating control signal and the contribution of the second control signal to the beating control signal can have a phase difference represented by $\phi_n$ where $\phi_n=\pi(n-1)/N$ where $\phi_n$ represents the phase differential for the phase differential generator 29 associated with phase differential generator index n and N represents the number of phase differential generator 29 associated with a phase differential generator index. As a result, the phase differentials ($\phi_n$) can be between 0 and $\pi$ with a constant phase change ($\pi/N$) between adjacent phase differentials ($\phi_n$).

A first optical pathway that the light included in the first control signal takes from the splitter 26 to light signal combiner 286 can have a different length than a second optical pathway that the light included in the second control signal takes from the splitter 26 to light signal combiner 286. As a result, the first optical pathway, the second optical pathway, the splitter 26 and the light signal combiner 286 in each of the phase differential generators 29 can function as a Mach-Zehnder interferometer.

The length of the first optical pathway and the second optical pathway can be selected to provide the phase differential ($\phi_n$) desired for each of the phase differential generators 2. For instance, the phase differential ($\phi_n$) for a phase differential generator 29 is function of the length of a first optical control pathway from the splitter 26 to the utility splitter 33 for the phase differential generator 29, the length of a second optical control pathway from the splitter 26 to the control splitter 30 for the phase differential generator 29, the length of the first waveguide 31, and the length of the second waveguide 34. Accordingly, the lengths of the optical control pathways and/or waveguides are selected to provide the desired phase differential ($\phi_n$) for each of the phase differential generators 29. The control waveguide 28 can include a delay section 37 that can be used to increase the length of the control waveguide 28. For instance, delay section 37 shown in FIG. 1A can represent a spiral arrangement of the control waveguide 28 in order to reduce the amount of space that the delay section 37 occupies on the LIDAR ship.

Because the electronics can tune the frequency of the outgoing LIDAR signal that is the source of the light included in the first control signal and the second control signal, the delay that is the source of the phase differential causes the second control signal to have a different frequency than the first control signal. Due to the difference in frequencies between the second control signal and the first control signal, the beating control signal is beating between the first control signal and the second control signal.

The light signal combiner 286 also splits the beating control signal onto a first detector waveguide 294 and a second detector waveguide 296. The first detector waveguide 294 carries a first portion of the beating control signal to a first light sensor 298 that converts the first portion of the beating control signal to a first electrical signal. The second detector waveguide 296 carries a second portion of the beating control signal to a second light sensor 300 that converts the second portion of the beating control signal to a second electrical signal. Examples of suitable light sensors include germanium photodiodes (PDs), and avalanche photodiodes (APDs).

In some instances, the light signal combiner 286 splits the beating control signal such that the portion of the first signal included in the first portion of the beating control signal is phase shifted by 180° relative to the portion of the first signal included in the second portion of the beating control signal.

An example of a suitable light signal combiner 286 is a Multi-Mode Interference (MMI) device such as a 2×2 MMI device. Other suitable light signal combiners 286 include, but are not limited to, adiabatic splitters, and directional couplers. In some instances, the functions of the illustrated light signal combiner 286 are performed by more than one optical component or a combination of optical components.

Figure 6C:
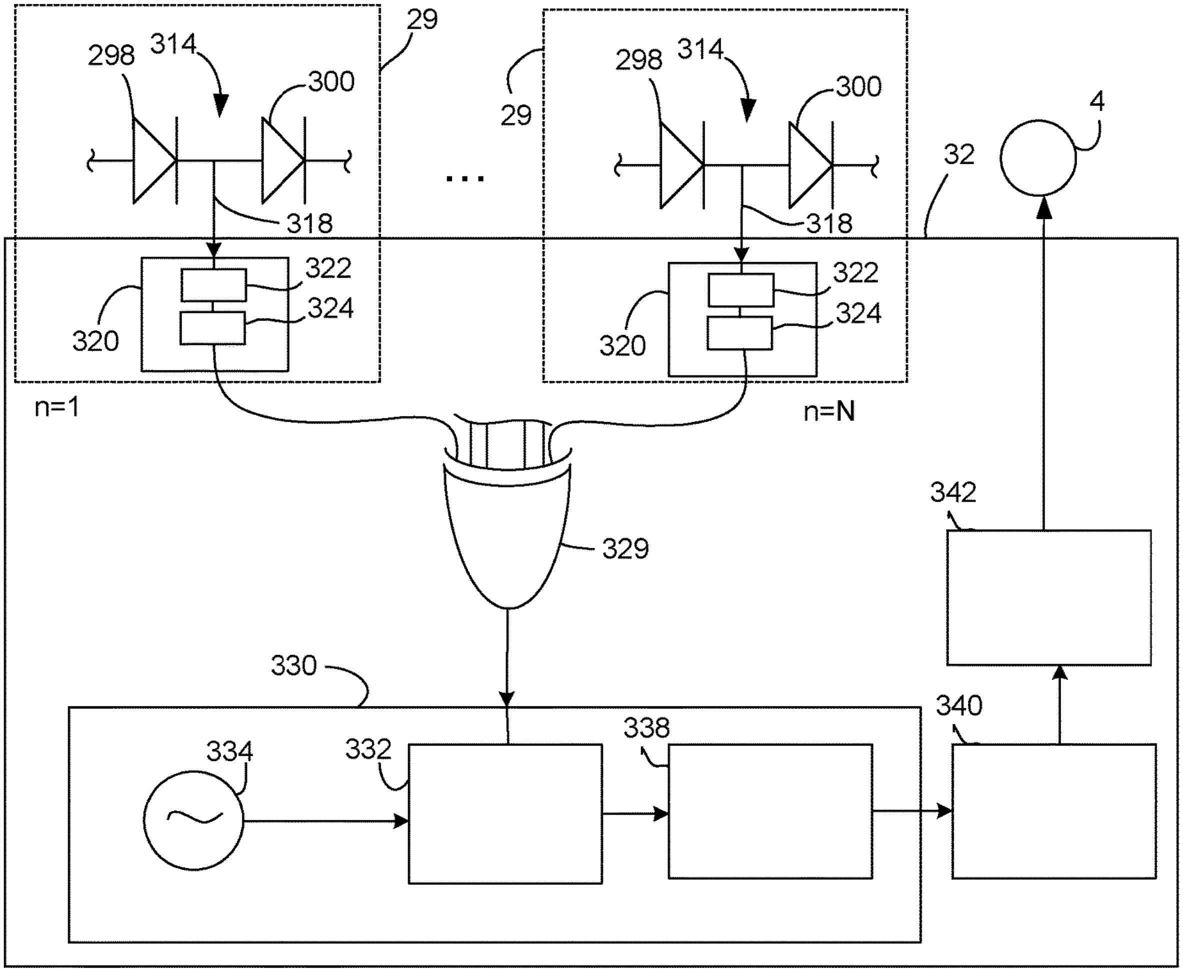

FIG. 6C is a schematic showing the relationship between the electronics and the different phase differential generators 29. The symbol for a photodiode is used to represent the first light sensor 298 and the second light sensor 300 but one or more of these sensors can have other constructions. In some instances, all of the components illustrated in the schematic of FIG. 6C are included on the LIDAR chip. In some instances, the components illustrated in the schematic of FIG. 6C are distributed between the LIDAR chip and electronics located off of the LIDAR chip.

The first light sensor 298 and the second light sensor 300 can be connected as a balanced detector. For instance, in FIG. 6C, the electronics connect the first light sensor 298 and the second light sensor 300 as a balanced detector 314. In particular, the first light sensor 298 and the second light sensor 300 are connected in series. The serial connection in the balanced detector is in communication with a data line 318 that carries the output from the balanced detector as an electrical beating control signal.

The electrical beating control signal is an electrical representation of the beating control signal. Accordingly, the electrical beating control signal is beating at the beat frequency of the beating control signal.

The electrical beating control signal is received by a waveform converter 320 that outputs a converted signal. The waveform converter 320 is configured to convert the waveform of the electrical beating control signal from a sinusoidal current to a square wave voltage or a substantially square wave voltage. Accordingly, the waveform converter 320 outputs a converted signal. In one example, the waveform converter includes an amplifier 322 connected in series with a comparator 324 such that the amplifier 322 receives the electrical beating control signal and the comparator outputs the converted signal. Suitable waveform converter 320 include, but are not limited to, linear trans-impedance amplifiers (TIAs) followed by voltage comparators, non-linear limiting TIAs followed by comparators, and current-mode comparators.

Each of the phase differential generators 29 outputs a different converted signal. The electronics 32 include a digital logic gate 329 that receives the converted signals from the phase differential generators 29. Suitable digital logic gates 329 include, but are not limited to, combinational logic-based edge combiners, such as XOR gate, or an exclusive OR gate, and sequential logic-based edge combiners. As a result, the digital logic gate outputs a falling or rising edge in response to one of the converted signals having a baseline crossing. Otherwise, the digital logic gate output doesn't go through a transition. In some instances, the baseline crossing of a converted signal is a zero-crossing of the converted signal.

Figure 6D:
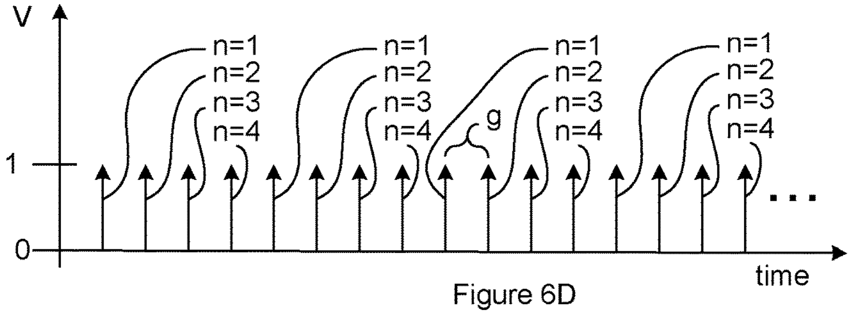
FIG. 6D is a graph showing baseline crossings of an electrical beating control signal versus time.

FIG. 6D provides an illustration of the amplitude of the logic signal over time for N=4 phase differential generators 29 that provide phase differentials (On) according to $\phi_n=\pi(n-1)/N$ where the phase differentials (On) represent the phase differential between the first signal and the second signal in the beating control signals of different phase differential generators 29. The transition points of the voltage values in FIG. 6D indicated by arrows each occurs at the time of a baseline crossing of one of the converted signals and accordingly at the time of a baseline crossing of an electrical beating control signal. As a result, FIG. 6D can represent a graph of the timing of the baseline crossings for the converted signals. Since the converted signals are conversions of the electrical beating control signals, the baseline crossing for the converted signals can represent baseline crossings of the electrical beating control signals. For instance, FIG. 6D can represent a graph of zero crossings for the converted signals over time and/or for the electrical beating control signals over time. Each of the falling or rising edges indicated by arrows, labeled with the phase differential generator index (n) that is the source of the baseline crossing that caused the high voltage value.

Each of the first signals and each of the second signals includes, consists of, or consists essentially of light from the outgoing LIDAR signal. As a result, when the frequency of the outgoing LIDAR signal has a linear chirp, the phase differentials ($\phi_n$) of the different phase differential generators 29 are spaced apart by a constant $\pi/N$ ($\pi/4$ in this example). Accordingly, when the frequency chirp of the outgoing LIDAR signal is linear, a time gap (labeled g in FIG. 6D) between adjacent edges in the logic signal remains constant over the duration of the chirp. As a result, when the frequency chirp of the outgoing LIDAR signal is linear, the time gap between baseline crossings is constant over the duration of the chirp. However, as the actual chirp rate ($\alpha_a$) deviates from a target chirp rate ($\alpha$), the time gap (labeled g in FIG. 6D) between adjacent edges in the logic signal varies with time. As a result, changes in the time gap between adjacent edges indicate a non-linear chirp and a variable chirp rate. Accordingly, the time gap between adjacent edges in the logic signal, and also between baseline crossings in the beating signals, is a function of the actual chirp rate ($\alpha$) of the outgoing LIDAR signal. For instance, increasing the actual chirp rate ($\alpha_a$) reduces the time gap (labeled g in FIG. 6D) between adjacent edges in the logic signal and between baseline crossings. Decreasing the actual chirp rate ($\alpha$) increases the time gap (labeled g in FIG. 6D) between adjacent edges in the logic signal and between baseline crossings.

The time gap is related to the frequency of the baseline crossings of the beating signals. For instance, the frequency can be approximated as 1/g. When the frequency chirp of the outgoing LIDAR signal is linear, the frequency of the baseline crossings remains constant over the duration of the chirp. When the frequency chirp of the outgoing LIDAR signal is linear, the time gap between baseline crossings is constant over the duration of the chirp. However, as the actual chirp rate ($\alpha_a$) deviates from a target chirp rate ($\alpha$), the frequency varies with time. As a result, changes in the frequency of the baseline crossings indicate a non-linear chirp and a variable chirp rate. Accordingly, the frequency of the baseline crossings in the beating signals is a function of the actual chirp rate ($\alpha$) of the outgoing LIDAR signal. For instance, increasing the actual chirp rate ($\alpha_a$) increases the frequency of the crossings in the beating signals while decreasing the actual chirp rate ($\alpha$)) increases the frequency of the crossings.

The chirp rate ($\alpha$) represents the target chirp rate for the outgoing LIDAR signal during a control chirp segment. Since the actual time gap between adjacent edges ($g_a$) is a function of the actual chirp rate ($\alpha_a$), the target chirp rate is associated with a target time gap ($g_t$). Since the time gap between adjacent edges also represents the time gap between baseline crossings, the actual time gap ($g_a$) can represent the actual time gap between baseline crossings of the beating signals and the target time gap ($g_t$) can represent the target time gap between beating signals. The actual time gap ($g_a$) can represent a function of multiple actual time gaps. For instance, the actual time gap ($g_a$) can each represent a value of the time gap averaged over multiple different time gaps. Similarly, the actual frequency ($f_a$) can represent a function of multiple baseline crossings. For instance, the actual frequency ($f_a$) can each represent a frequency that is averaged over multiple baseline crossings.

A target frequency ($f_t$) can each be associated with a particular control chirp segment. For instance, the data chirp segments with the same period index k can be associated with a target chirp rate and an associated target frequency ($f_t$). Target chirp rates and the associated target frequencies ($f_t$) that are associated with control chirp segments having different period indices (k) can be different or can be the same. The system can maintain the outgoing LIDAR signal at the desired chirp rate for the control chirp segments with period index k by maintaining, or substantially maintaining, the frequency of baseline crossings at the target frequency ($f_t$) associated with the control chirp segments with period index k.

A target chirp rate and an associated target time gap can each be associated with a particular control chirp segment. For instance, the control chirp segments with the same period index k can be associated with a target chirp rate and an associated target time gap. Target chirp rates and the associated target time gaps that are associated with control chirp segments having different period indices (k) can be different or can be the same. As noted above, the system can maintain the outgoing LIDAR signal at the desired chirp rate for the control chirp segments with period index k by maintaining, or substantially maintaining, the frequency of baseline crossings at the target frequency ($f_t$) associated with the control chirp segments with period index k. In one example, the system maintains, or substantially maintains, the frequency of baseline crossings at the target frequency ($f_t$) associated with the control chirp segments with period index k by operating the system so as to maintain, or substantially maintain, the actual time gaps between adjacent edges ($g_a$), or the actual time gaps between adjacent baseline crossings ($g_a$), at the target time gap ($g_t$) associated with the control chirp segments with period index k.

The system can operate a system so as to maintain, or substantially maintain, an actual time gap ($g_a$) at a target time gap ($g_t$) through the use of a feedback loop such as a phase lock loop (PLL). An example phase lock loop can lock the phase of the logic signal to the phase of a local oscillator. The error signal generator outputs an error signal with one or more characteristics that indicate the level and direction of disagreement between the actual time gap ($g_a$) and the target time gap ($g_t$). As a result, one or more characteristics of the error signal indicate the level and direction of disagreement between the chirp rate ($\alpha_a$) and the target chirp rate ($\alpha$) over time for the duration of a control chirp segment.

For instance, the electronics 32 illustrated in FIG. 6C include a schematic of one example of an error signal generator 330 that can be an analog error signal generator. The error signal generator 330 includes a phase detector 332 that receives the logic signal and outputs an example of an error signal. The phase detector 332 can be an analog phase detector. As a result, the error signal can be an analog signal.

The error signal generator 330 includes a local oscillator 334 that outputs a local signal that is also received at the phase detector 332. The local signal can be a continuous wave with a fixed frequency and phase. The frequency of the local signal is selected such that the local signal has baseline crossings separated by the target time gap ($g_t$). For instance, the frequency of the local signal can be selected such that the local signal has zero-crossings separated by the target time gap ($g_t$). In one example, the frequency of the local signal is selected to be equal to the frequency of the logic signal illustrated in FIG. 6D. As a result, when the phase of the logic signal is matched to the phase of the local signal, the edges in the logic signal are aligned with the baseline crossings of the local signal. Accordingly, when the phase of the local signal matches the phase of the logic signal, the sign and magnitude of the error signal does not show an error in the logic signal. However, as the actual chirp rate ($\alpha_a$) for the outgoing LIDAR signal moves away from the target chirp rate ($\alpha$), the magnitude and sign of the error signal show a magnitude and direction of the error between the actual chirp rate ($\alpha_a$) and the target chirp rate ($\alpha$). Accordingly, the local oscillator 334 serves as the reference for the target time gap ($g_t$). Suitable local oscillators include, but are not limited to, MEMS oscillator, crystal oscillator or an electronic phase-locked loop that is locked to a MEMS or crystal oscillator.

The error signal generator 330 can optionally include a filter 338 such as a low-pass filter that receives the error signal and outputs a filtered version of the error signal.

A suitable phase detector includes, but is not limited to, an analog mixed-based phase detector, a digital phase detector, or a phase-frequency detector using flip-flops. A suitable local oscillator includes, but is not limited to, a MEMS oscillator, crystal oscillator or an electronic phase-locked loop that is locked to a MEMS or crystal oscillator. A suitable filter 338 includes, but is not limited to, an analog RC filter, and digital filters.

The error signal is received at a control signal generator 340 that uses the error signal to modify a light source control signal. The light source control signal is the signal that a light source controller 342 applies to the light source 4 so cause the light source to output the light included in the outgoing LIDAR signal. For instance, the light source control signal can indicate the voltage level applied to the light source 4 over the duration of a frequency chirp or that is applied to a modulator included in the light source.

The control signal generator 340 can modify the light source control signal so as to correct for the magnitude and direction of the error indicated by the error signal. For instance, if the error signal indicates that the actual time gap ($g_a$) is 10% less than the target time gap ($g_t$), the control signal generator 340 can modify light source control signal so as to close the differential between the actual time gap ($g_a$) and the target time gap ($g_t$). As an example, the control signal generator 340 can modify the light source control signal such that the application of the modified light source control signal to the light source would cause an approximately 10% increase in the actual time gap ($g_a$). In some instances, an approximately 10% increase in the actual time gap ($g_a$) may be achieved by modifying the light source control signal such that the voltage applied to the light source is decreased by about 10%.

In some instances, the control signal generator 340 adjusts the modified light source control signal so as to generate an adjusted light source control signal. As an example, the control signal generator 340 can multiply the modified light source control signal by an adjustment factor to generate the adjusted light source control signal. The light source controller 342 can receive the modified light source control signal and/or the adjusted light source control signal from the control signal generator 340. As will be described below, in some instances, the outgoing LIDAR signal is in a data stage and in other instances, the outgoing LIDAR signal is in a control stage. When the outgoing LIDAR signal is in the control stage, the light source controller 342 can apply the modified light source control signal to the light source 4 as the light source control signal. When the outgoing LIDAR signal is in the data stage, the light source controller 342 applies the adjusted light source control signal to the light source 4 as the light source control signal.

As noted above, the light source control signal is modified such that application of the light source control signal to the light source closes the differential between the actual time gap ($g_a$) and the target time gap ($g_t$). Closing this differential locks the phase of the logic signal to the phase of the local signal. Since the phase of the local signal is constant, the phase of the logic signal also stays constant. Since a linear chirp will generate a logic signal with a constant phase, the constant phase of the logic signal indicates the presence of the linear chirp. As a result, the light source control signal is controlled by a feedback loop where the phase of the logic signal is locked to the phase of the local signal.

Two or more components selected from the group consisting of the error signal generator 330, control signal generator 340 and the light source controller 342 can be the same component or different components. In some instances, the control signal generator 340 and the light source controller 342 are integrated as the same component. In some instances, the control signal generator 340 and the error signal generator 330 are integrated as the same component. An example of a suitable control signal generator 340 includes, but is not limited to, a DSP chip, FPGA, and microprocessor. An example of a suitable control signal generator 340 executes the attributed functions using firmware, hardware, or software or a combination thereof. An example of a suitable light source controller 342 includes, but is not limited to, a current mode DAC or a voltage DAC followed by a transconductance amplifier.

Figure 6E:
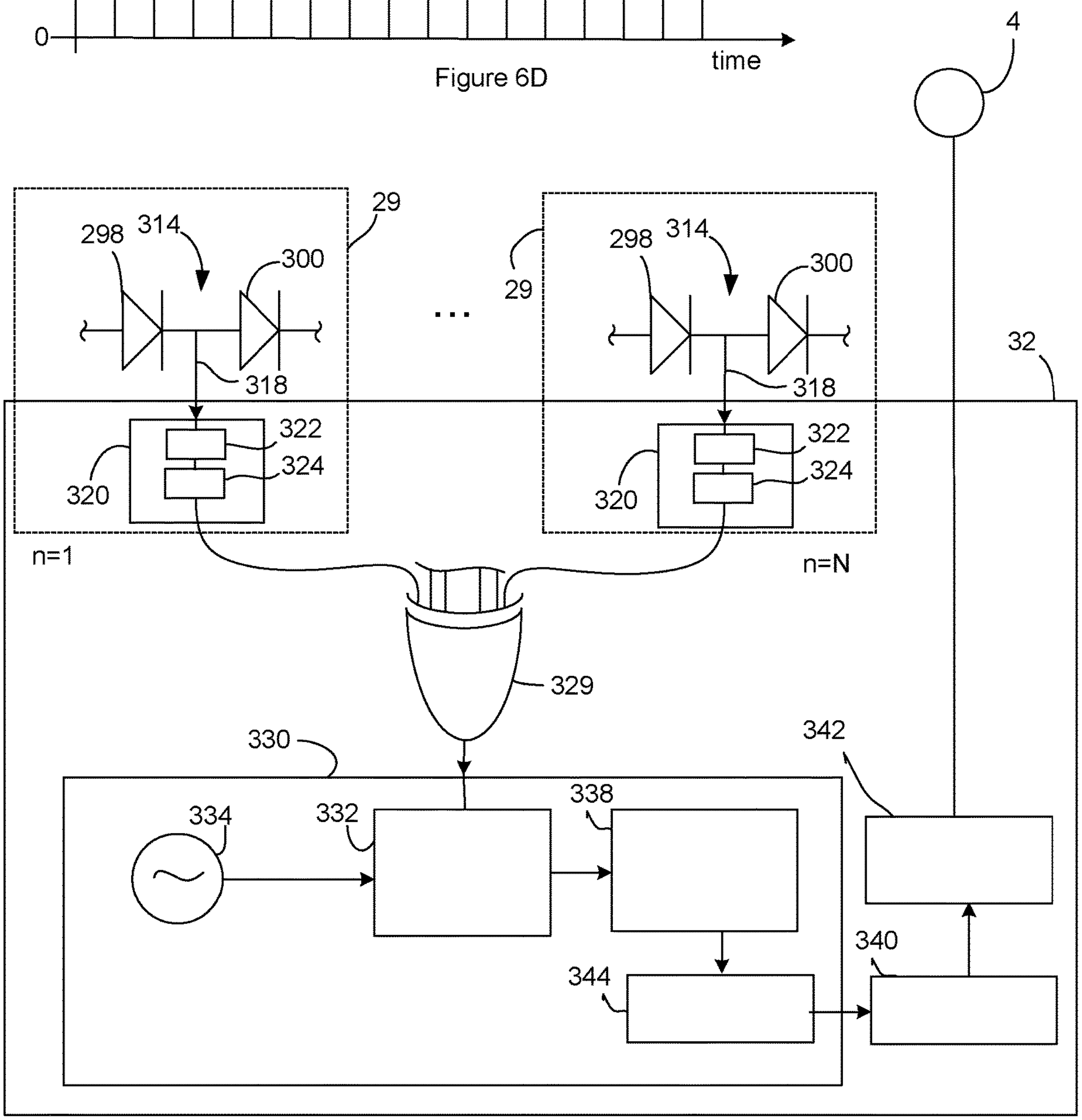
FIG. 6E is a schematic of an example of another relationship between the electronics and light sensors that can be included on a LIDAR chip.
Figure 6F:
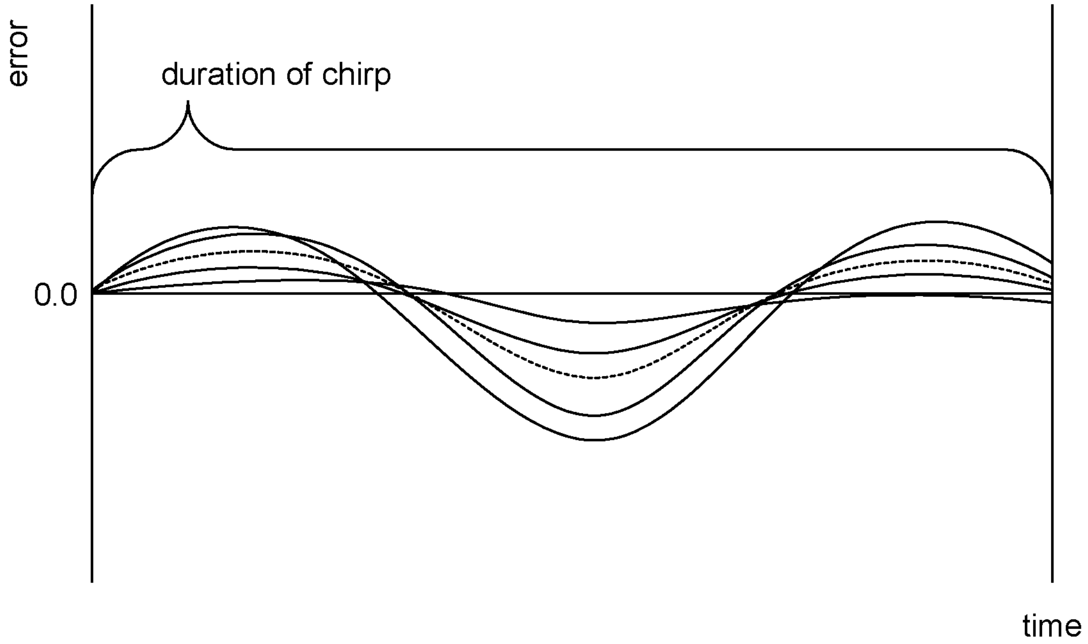
FIG. 6F is a graph of multiple different error signals over the duration of a frequency chirp.

FIG. 6E illustrates the relationship between the electronics and the phase differential generators 29 of FIG. 6C modified so as to be used with a digital error signal generator 330. The error signal generator 330 can include a digital phase detector 332 and filter 338. The error signal output from the phase detector 332 can be a digital signal that is received at a storage device 344. When a filter 338 receives the error signal, the filtered error signal from the filter 338 can be digital signal that is received at the storage device 344. The storage device stores the error signals from multiple different control chirp segments for the duration of the frequency chirp in the control chirp segment. As an example, the solid lines in FIG. 6F illustrate an example of the error signals that are each associated with period index k=1. The y axis represents the direction and magnitude of the error indicated by the error signal. For instance, the error shown on the y-axis can represent the one or more characteristics that indicate the level and direction of disagreement between the actual time gap ($g_a$) between adjacent edges in the logic signal and the target time gap ($g_t$). In one example, the error shown on the y-axis represents the percentage difference between the actual time gap ($g_a$) between adjacent edges in the logic signal and the target time gap ($g_t$) between adjacent edges in the logic signal. Suitable storage devices 344 include random-access memory (RAM).

The control signal generator 340 has access to the signals stored in the storage device 344. In response to a threshold number of error signals that are each associated with the same period index k being stored in the storage device 344, the control signal generator 340 can generate one or more composite error signals from all or a portion of the stored error signals. For instance, the control signal generator 340 can average error signals that are each associated with the same period index k to generate a composite error signal that is an average of the error signals as a function of time. As an example, the dashed line in FIG. 6F can represent an average of the stored error signals from control chirp segments associated with the same period index (k=1). The dashed line can represent the composite error signal over the duration of the frequency chirp during the control chirp segment.

Since the solid lines in FIG. 6F are associated with the period index k=1, the resulting composite error signal is also associated with the period index k=1. Accordingly, the dashed line illustrated in FIG. 6F is associated with control chirp segments that are each associated with k=1. However, the control signal generator 340 can generate a composite error signal for all or a portion of the different period indices (k). In some instances, the control signal generator 340 stores the composite error signal over time for one or more of the different period indices (k) in the storage device 344.

Figure 6G:
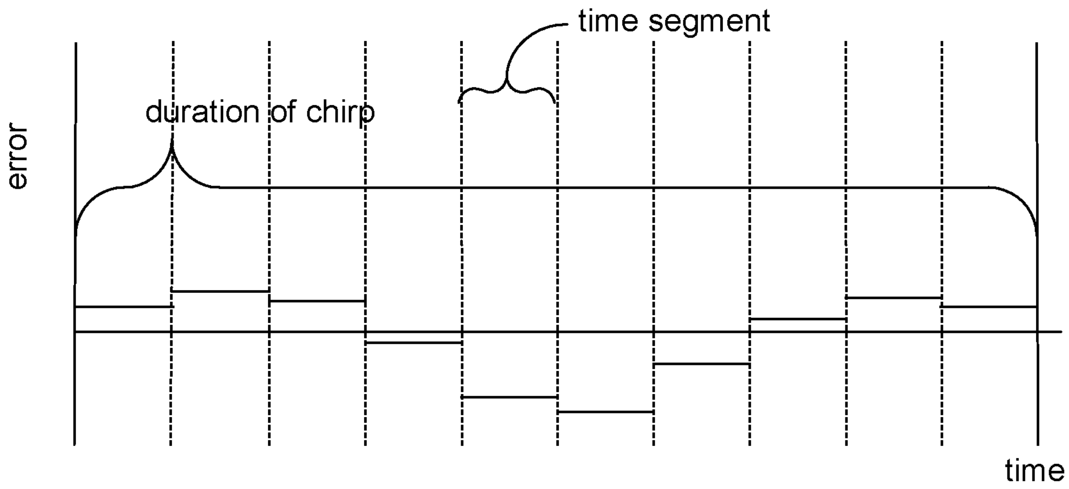
FIG. 6G is a graph of a composite error signal.

The signals in FIG. 6F appear as analog signals, however, the signals can be digital signals. As a result, the time axis can be divided into time segments that each have a constant duration. For the purposes of illustration, the time segments in the signals of FIG. 6F are sufficiently short for digital signals to appear as continuous over time. For the purposes of illustration, FIG. 6G shows the composite error signal of FIG. 6F as a digital signal divided into multiple time segments. The time segments shown in FIG. 6G are longer than FIG. 6F in order to make the digital nature of the composite error signal evident in the image.

In some instances, the control signal generator 340 makes a determination whether to generate a modified light source control signal. The control signal generator 340 can calculate a composite error level for the composite error signal. For instance, the control signal generator 340 can calculate a deviation or root mean square of the composite error signal over the duration of the chirp. The control signal generator 340 can compare the composite error level to one or more error criteria to determine whether to generate a modified light source control signal. For instance, the control signal generator 340 can compare the composite error level to an error threshold. The control signal generator 340 can generate a modified light source control signal in response to the composite error level exceeding the error threshold. The control signal generator 340 can refrain from generating the modified light source control signal in response to the composite error level being less than or equal to the error threshold.

Figure 6H:
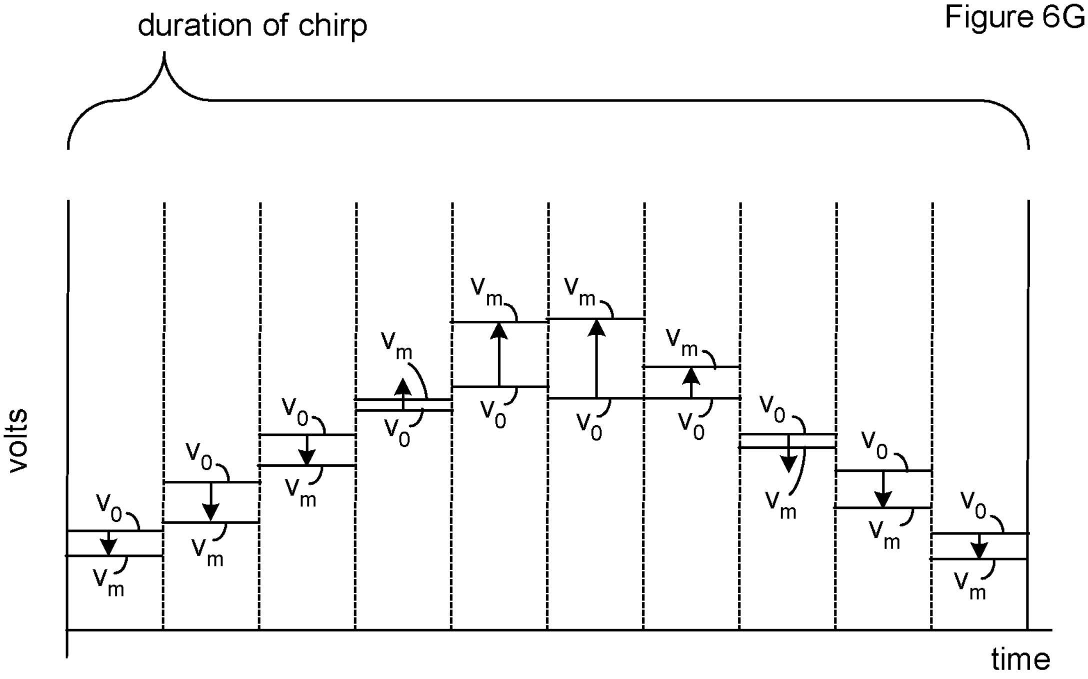
FIG. 6H illustrates an example of the waveform of a light source control signal and a modified light source control signal for the duration of a chirp during control chirp segments that are each associated with the same period index.

The control signal generator 340 can modify a waveform of the light source control signal so as to correct for the magnitude and direction of the error indicated by the composite error signal. FIG. 6H illustrates an example of the waveform of a light source control signal associated with the period index (k). Each of the illustrated voltage levels represents the voltage that is applied to the light source 4 during the associated time segment. The voltage levels labeled $V_0$ represent the waveform of the light source control signal. Accordingly, a series of digital signals or bits that represent the series of voltage levels labeled $V_0$ over the duration of a chirp can serve as a digital representation of the light source control signal.

The control signal generator 340 can modify the waveform of the light source control signal ($V_0$) to have the waveform represented by the voltage levels labeled ($V_m$). Accordingly, the voltage levels labeled $V_m$ represent the waveform of a modified light source control signal. As a result, a series of digital signals or bits that represent the series of voltage levels labeled $V_m$ over the duration of a chirp can serve as a digital representation of the modified light source control signal.

The modification of the light source control signal can correct for the magnitude and direction of the error indicated by the composite error signal. For instance, the control signal generator 340 can modify the light source control signal so as to generate a modified light source control signal that reduces the magnitude of the error levels indicated by the composite error signal. As an example, FIG. 6G can represent the composite error signal that results from applying the light source control signal of FIG. 6H to the light source during control chirp segments with the period index that is also associated with the composite error signal. The error on the y-axis in FIG. 6G can represent the percentage differential where the percentage differential represents the percent difference between the actual time gap ($g_a$) between adjacent edges in the logic signal and the target time gap ($g_t$) between adjacent edges in the logic signal (er). The light source control signal can be modified such that the applied voltage during each time segment is changed by the percentage of the percentage differential for that time segment but in the opposite direction. For instance, when the percentage differential for a time segment indicates that the actual time gap ($g_a$) for that time segment is 10% less than the target time gap ($g_t$), the voltage of the light source control signal for that time segment can be increased by 10%. Accordingly, the value of $V_m$ for each time segment can be generated from $V_m=V_0*(1-(er/100))$ where er represents the percentage differential and the value of $V_m$, $V_o$, and er are associated with the same time segment. The errors values labeled $V_m$ can represent the modified waveform of the light source control signal. Accordingly, a digital signal that represents the sequence of errors values labeled $V_m$ can serve as the modified light source control signal.

Since the light source control signals are each associated with different period indices, the control signal generator 340 can generate different modified light source control signals that are each associated with a different period index.

The above example of light source control signal modification changes the light source control signal in proportion to the level of error indicated by the composite error signal, however, other relationships or more complex filtering and signal shaping can be used. For instance, an association between a change in the light source control signal and different error values can be stored in the storage device 344. For a given composite error, the control signal generator 340 can modify the light source control signal as indicated by the change in the light source control signal associated with the given composite error. The association between the composite error and the change in the light source control signal can be expressed in a data structure such as a look-up table, a mathematical formula, filter, and/or an adaptive filter.

In some instances, the control signal generator 340 adjusts the modified light source control signal so as to generate an adjusted light source control signal. As an example, the control signal generator 340 can multiply the modified light source control signal by an adjustment factor to generate the adjusted light source control signal. The light source controller 342 can receive the modified light source control signal and/or the adjusted light source control signal from the control signal generator 340. As will be described below, in some instances, the outgoing LIDAR signal is in a data stage and in other instances, the outgoing LIDAR signal is in a control stage. When the outgoing LIDAR signal is in the control stage, the light source controller 342 can apply the modified light source control signal to the light source 4 as the light source control signal. When the outgoing LIDAR signal is in the data stage, the light source controller 342 applies the adjusted light source control signal to the light source 4 as the light source control signal.

The light source controller 342 can include a digital-to-analog converter. When the light source controller 342 receives the modified light source control signal, the digital-to-analog converter converts the modified light source control signal to an analog signal. When the light source controller 342 receives the adjusted light source control signal, the digital-to-analog converter converts the adjusted light source control signal to an analog signal. The application of the light source control signal to the light source includes the application of the analog version of the light source control signal to the light source. For instance, application of the modified light source control signal to the light source can include application of the analog version of the modified light source control signal to the light source. Application of the adjusted light source control signal to the light source can include application of the analog version of the modified light source control signal to the light source. Because different light source control signals are associated with different period indices, the light source controller 342 applies the adjusted light source control signals such that the control chirp segments and the light source control signal being applied to the light source are associated with the same period index. As a result, different light source control signals can be applied to the light source during the different control chirp segments in a cycle. Further, the same light source control signals can be applied to corresponding control chirp segments in multiple different cycles.

The digital version of the modified light source control signal can be stored in the storage device and can serve as the light source control signal that can later be modified by the control signal generator 340. After generation of the composite error signal associated with a control chirp segment index, the control signal generator 340 can clear the storage device for the storage of another set of error signals associated with that period index.

Figure 7A:
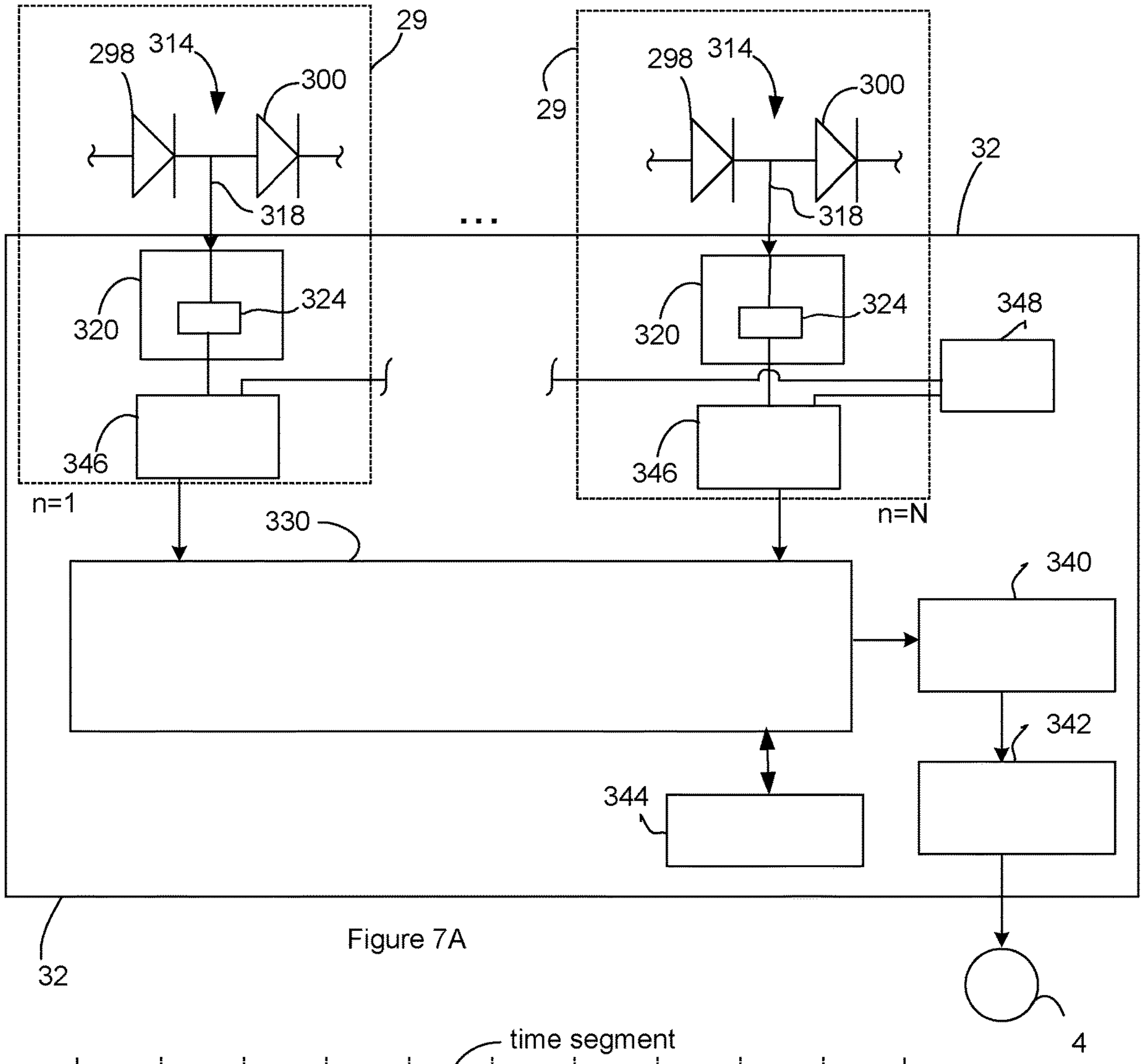
FIG. 7A is a schematic of an example of a relationship between the electronics and light sensors that can be included on a LIDAR chip.

FIG. 7A is a schematic showing another example of a relationship between the electronics and the different phase differential generators 29. Each of the phase generators includes a counter 346 that receives the converted signal from the waveform converter 320. Each of the counters also receives an event signal from a clock 348 such as a time-to-digital-converter. The event signal can indicate the occurrence of events such as the arrival of an incoming electrical pulse. Each counter 346 can count a number of baseline crossings in the converted signal during the time intervals. For instance, each counter 346 can count a number of zero crossings in the converted signal during the time intervals. Suitable counters include, but are not limited to, synchronous counters.

Each of the counters outputs a counter data signal that indicates the number of baseline crossings during the different time intervals. The counter data signal output from different phase differential generators 29 are received by the error signal generator 330. The error signal generator 330 can be a digital component such as a digital controller, processor, or microprocessor. As a result, the error signal generator 330 can include and/or can perform functions of the control signal generator 340 disclosed in the context of FIG. 6E. Alternately, electronics of FIG. 7A can include a control signal generator 340 in addition to the error signal generator 330.

In addition to receiving the counter data signal, the error signal generator 330 can receive the duration of each of the time intervals from the clock. The error signal generator 330 can divide the number of baseline crossing during a time interval by the duration of the time interval to determine the period between the baseline crossings in each of the different converted signals. Additionally, the error signal generator 330 can identify the time at which the leading edge of each converted signal, and accordingly each electrical beating control signal, occurs by accumulating the time intervals. The time of the leading edge for each converted signal combined with the period between the baseline crossings of the converted signals indicates the time at which each of the baseline crossings occurs. The timing of the baseline crossings from different converted signals plotted on the same timeline provides a graph such as the graph in FIG. 2C. As a result, the error signal generator 330 combines the timing of baseline crossings from different converted signals to calculate the actual time gap between baseline crossings ($g_a$).

Figure 7B:
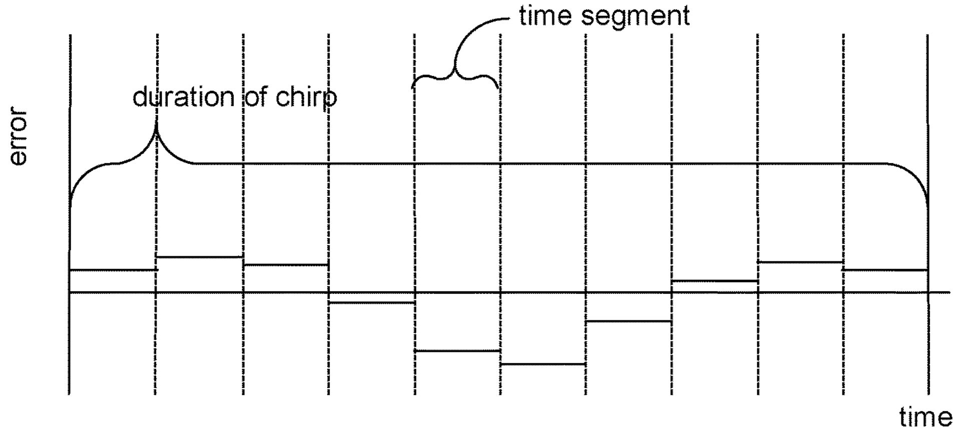
FIG. 7B is a graph of an error signal over the duration of a frequency chirp.

The error signal generator 330 can calculate the error between the actual time gap between baseline crossings ($g_a$) and the target time gap between baseline crossings ($g_t$). For instance, the error can be calculated as the difference between the actual time gap between baseline crossings ($g_a$) and the target time gap ($g_t$) or as the percent change from the target time gap ($g_t$) to the actual time gap ($g_a$). The series of error values calculated over the duration of a chirp can serve as an error signal as disclosed in the context of FIG. 6F and as shown in FIG. 7B. As noted above, the target time gaps ($g_t$) are associated with a period index. Accordingly, a series of error values calculated over the duration of a chirp that can serve as an error signal are associated with one of the period indices. The error signal generator 330 can have access to a memory 344 and can store the error values and resulting error signals in a memory 344.

Figure 7C:
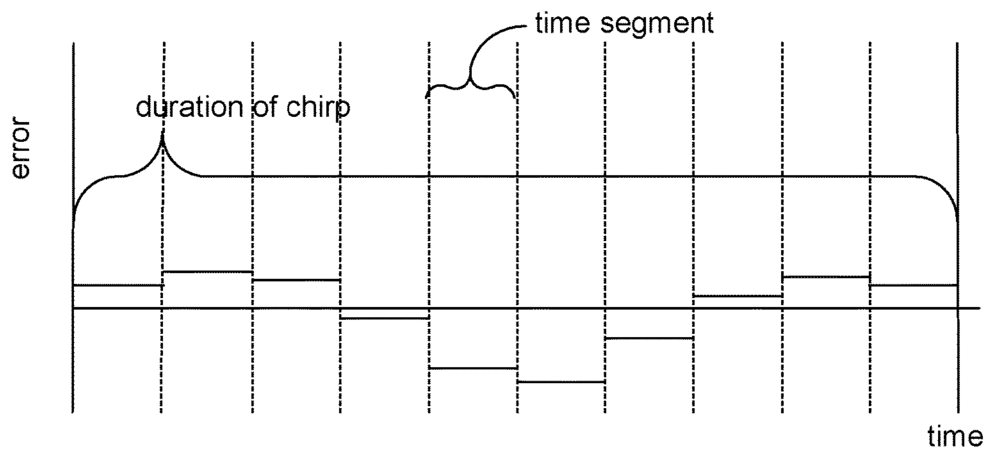
FIG. 7C is a graph of a composite error signal.

In response to a threshold number of error signals that are each from control chirp segments with the same period index k being stored in the storage device 344, the error signal generator 330 can generate composite error values from all or a portion of the stored error values. Accordingly, the error signal generator 330 can generate one or more composite error signals from all or a portion of the stored error signals. For instance, the error signal generator 330 can average the error signals from multiple control chirp segments that each have the same period index k to generate composite error values that are each an average of the error signals as a function of time. As an example, the error values in FIG. 7C can represent an average of the stored error values from control chirp segments associated with the same period index (i.e. k=1) where the averaged error value for a time segment is an average across the error values for that time segment. The digital signals that carry the composite error values over the duration of the frequency chirp can serve the composite error signal.

Since the composite error values and the resulting error signals are associated with the period index, i.e. k=1 ($DP_1$), the error values and the resulting composite error signal are also associated with the period index k=1 ($DP_1$). As a result, the error signal generator 330 can generate composite error values and/or a composite error signal for all or a portion of the different period indices (k). In some instances, the error signal generator 330 stores in the storage device 344 the composite error values and/or a composite error signal over the duration of a frequency chirp for one or more of the different period indices (k).

In some instances, the error signal generator 330 makes a determination whether to generate a modified light source control signal. The error signal generator 330 can calculate a composite error level for the composite error signal. For instance, the error signal generator 330 can calculate a deviation or root mean square of the composite error values over the duration of the chirp. The error signal generator 330 can compare the composite error level to one or more error criteria to determine whether to generate a modified light source control signal. For instance, the error signal generator 330 can compare the composite error level to an error threshold. The error signal generator 330 can generate a modified light source control signal in response to the composite error level exceeding the error threshold. The error signal generator 330 can refrain from generating the modified light source control signal in response to the composite error level being less than or equal to the error threshold.

Figure 7D:
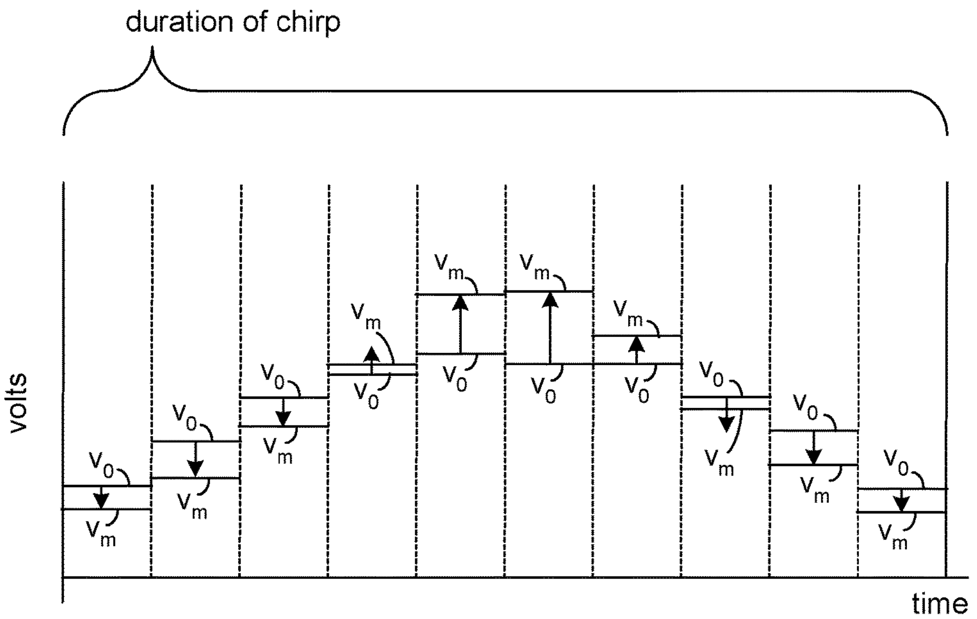
FIG. 7D illustrates an example of the waveform of a light source control signal and a modified light source control signal for the duration of a chirp during control chirp segments that are each associated with the same period index.

The error signal generator 330 can modify a waveform of the light source control signal so as to correct for the magnitude and direction of the error indicated by the composite error signal. FIG. 7D illustrates an example of the waveform of a light source control signal for the duration of the chirp during different control chirp segments that are each associated with the same period index (k). Each of the illustrated voltage levels represents the voltage that is applied to the light source 4 during the associated time segment. The voltage levels labeled $V_0$ represent the waveform of the light source control signal.

The light source control signal can be modified so as to correct for the magnitude and direction of the error indicated by the composite error signal. For instance, the error signal generator 330 can modify the light source control signal so as to generate a modified light source control signal that reduces the magnitude of the error levels indicated by the composite error signal. As an example, FIG. 7D can represent the composite error signal that results from applying the light source control signal of FIG. 7C to the light source during control chirp segments with the same period index that is associated with the composite error signal. The y-axis in FIG. 7C can represent the percentage differential where the percentage differential represents the percent difference between the actual time gap ($g_a$) between adjacent high voltage values in the logic signal and the target time gap ($g_t$) between adjacent high voltage values in the logic signal (er). The light source control signal can be modified such that the applied voltage during each time segment is changed by the percentage of the percentage differential for that time segment but in the opposite direction. For instance, when the percentage differential for a time segment indicates that the actual time gap ($g_a$) for that time segment is 10% less than the target time gap ($g_t$), the voltage of the light source control signal for that time segment can be increased by 10%. Accordingly, the value of $V_m$ for each time segment can be generated from $V_m=V_0*(1-(er/100))$ where er represents the percentage differential and the value of $V_m$, $V_o$, and er are associated with the same time segment.

The light source control signals are each associated with different control chirp segments and accordingly with different period indices. As a result, the error signal generator 330 can generate different modified light source control signals that are associated with a different period indices.

The above example of light source control signal modification changes the light source control signal in proportion to the level of error indicated by the composite error signal, however, other relationships can be used. For instance, an association between a change in the light source control signal and different error values can be stored in the storage device 344. For a given composite error, the error signal generator 330 can modify the light source control signal as indicated by the change in the light source control signal associated with the given composite error. The association between the composite error and the change in the light source control signal can be expressed in a data structure such as a look-up table, a mathematical formula, one or more filters, and one or more adaptive filters.

A control signal generator 340 can receive the modified light source control signal from the error signal generator 330. In some instances, the control signal generator outputs the modified light source control signal. In other instances, the control signal generator adjusts the modified light source control signal so as to generate an adjusted light source control signal. As an example, the modified light source control signal can be multiplied by an adjustment factor to generate an adjusted light source control signal. The light source controller 342 can receive the modified light source control signal and/or the adjusted light source control signal from the control signal generator. As will be described below, in some instances, the outgoing LIDAR signal is in a data stage and in other instances, the outgoing LIDAR signal is in a control stage. When the outgoing LIDAR signal is in the control stage, the light source controller 342 can apply the modified light source control signal to the light source 4 as the light source control signal. When the outgoing LIDAR signal is in the data stage, the light source controller 342 applies the adjusted light source control signal to the light source 4 as the light source control signal.

The light source controller 342 can include a digital-to-analog converter. When the light source controller 342 receives the modified light source control signal, the digital-to-analog converter converts the modified light source control signal to an analog signal. When the light source controller 342 receives the adjusted light source control signal, the digital-to-analog converter converts the adjusted light source control signal to an analog signal. The application of the light source control signal to the light source includes the application of the analog version of the light source control signal to the light source. For instance, application of the modified light source control signal to the light source can include application of the analog version of the modified light source control signal to the light source. Application of the adjusted light source control signal to the light source can include application of the analog version of the modified light source control signal to the light source. Because different light source control signals are associated with different period indices, the light source controller 342 applies the adjusted light source control signals such that the control chirp segments and the light source control signal being applied to the light source are associated with the same period index. As a result, different light source control signals can be applied to the light source during the different control chirp segments in a cycle. Further, the same light source control signals can be applied to corresponding control chirp segments in multiple different cycles.

The digital version of the modified light source control signal and/or adjusted light source control signal can be stored in the storage device and can serve as the light source control signal.

After generation of the composite error signal associated with a period index, the error signal generator 330 can clear the storage device for the storage of another set of error signals associated with that period index.

As noted above, the control waveguide 28 shown in FIG. 1A through FIG. 1C can include a delay section 37 that can be used to increase the length of the control waveguide 28. Increasing the length of the control waveguide 28 increases the difference between the length of the first optical pathway and the length of the second optical pathway. Increasing the length difference between these pathways increases the beat frequency of the beating control signals. The increased beat frequency increases the number of baseline crossings that provide the time gaps disclosed above. As a result, increasing the length difference between these pathways can reduce the size of these time gaps and can accordingly increase the resolution in the modification of the light source control signal.

As an alternative to the delay section 37 in the control waveguide 28 or in addition to the delay section 37 in the control waveguide 28, the first waveguide 31 or the second waveguide 34 in all or a portion of the phase differential generators 29 can include a delay section 37. However, a delay section 37 can occupy an undesirably large amount of space on a semiconductor chip such as a LIDAR chip. As a result, the ability to have a single delay section 37 as shown in FIG. 1A through FIG. 1C can provide a more efficient use of the available space on the LIDAR chip.

Figure 8:
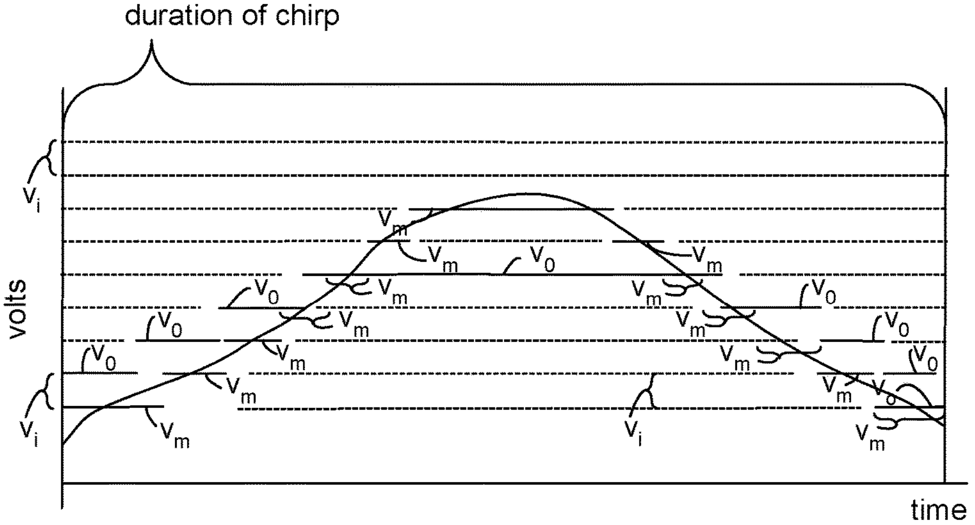
FIG. 8 is a graph of voltage versus time showing an example of the voltage levels for a light source control signal and a modified light source control signal.

Although digital versions of the light source control signal and the modified light source control signal and are disclosed above as having voltage levels at constant time segments, the light source control signal and the modified light source control signal can have voltage levels separated by constant voltage increments for variable time periods. As an example, FIG. 8 is a graph of voltage versus time showing an example of the voltage levels for a light source control signal and a modified light source control signal. The constant voltage increments are labeled $v_i$. The graph includes voltage levels labeled $V_m$ and $V_0$ that have varying durations as indicated by the time axis. The duration of voltage levels that are labeled $V_m$ and overlap a voltage level labeled $V_0$ are shown by brackets rather than lines.

The voltage levels labeled $V_0$ represent the waveform of the light source control signal. Accordingly, a series of digital signals or bits that represent the duration of the voltage levels labeled $V_0$ over the duration of a chirp can serve as a digital representation of the light source control signal. A control signal generator 340 and/or an error signal generator 330 can use a composite error signal disclosed above to modify the waveform of the light source control signal ($V_0$) to have the waveform represented by the voltage levels labeled ($V_m$). Accordingly, the voltage levels labeled $V_m$ represent the waveform of a modified light source control signal. A series of digital signals or bits that represent the duration of the voltage levels labeled $V_m$ over the duration of a chirp can serve as a digital representation of the modified light source control signal.

FIG. 8 includes a solid curved line that can represent an example of an analog version of the modified light source control signal that a digital-to-analog converter can generate from the voltage levels labeled $V_m$. The light source controller 342 can apply the analog version of the modified light source control signal to the light source 4 as an analog light source control signal. Additionally, or alternately, the analog version of the modified light source control signal can be multiplied by an adjustment factor to provide an analog version of an adjusted light source control signal that the light source controller 342 can apply to the light source 4. Alternately, the $V_m$ values in FIG. 8 can each be multiplied by the adjustment factor to provide a digital adjusted light source control signal. The digital adjusted light source control signal can be converted to an analog version of an adjusted light source control signal that the light source controller 342 can apply to the light source 4.

Figure 9A:
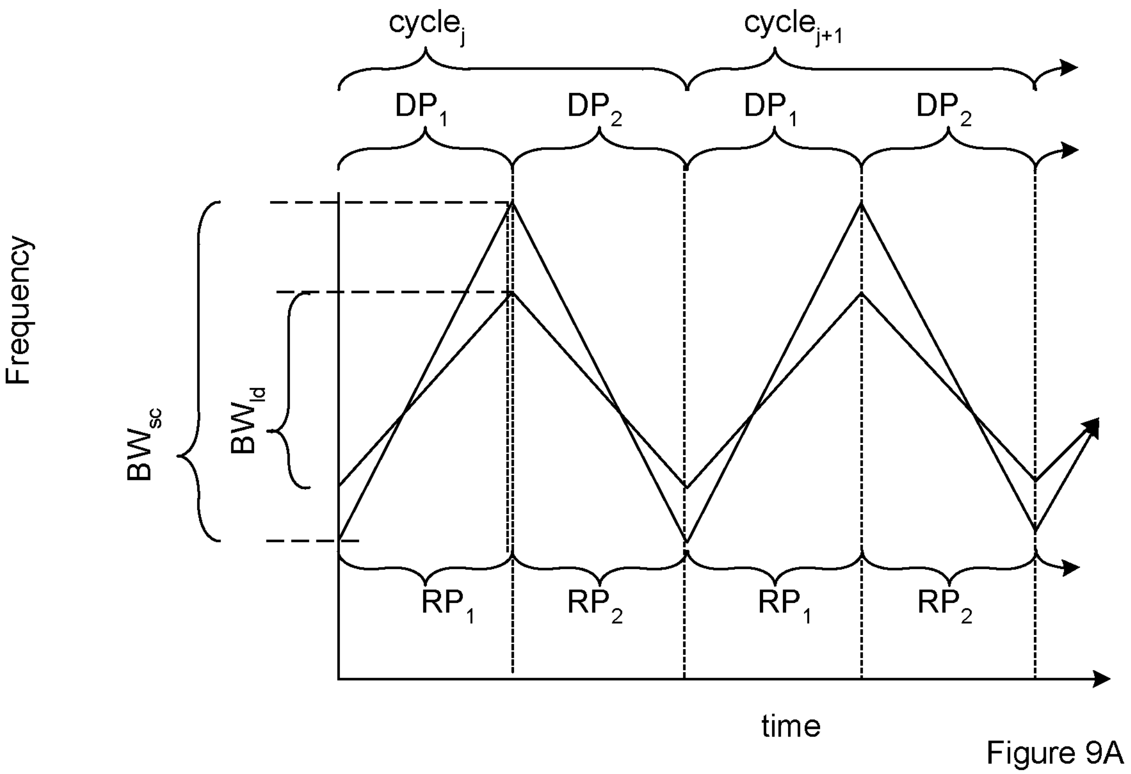
FIG. 9A is a graph of a frequency versus time pattern for a system output signal used during the generation of modified light source control signals superimposed on the frequency versus time pattern of system output signal used during the generation of LIDAR data.

The frequency versus time pattern of the outgoing LIDAR signal and the resulting system output signal used to generate LIDAR data can be different from the frequency versus time pattern of the outgoing LIDAR signal used to generate modified light source control signals. As an example, FIG. 9A is a graph showing an example of a frequency versus time pattern for a system output signal used during the generation of the modified light source control signals superimposed on the frequency versus time pattern of the system output signal used during the generation of the LIDAR data. For instance, FIG. 9A could represent the frequency versus time pattern of FIG. 5C superimposed on the frequency versus time pattern of FIG. 6A. The portion of the outgoing LIDAR signal having a frequency versus time pattern for generation of modified light source control signals is labeled sc and corresponds to the outgoing LIDAR and any resulting system output signal being in a control stage. The portion of the system output signal having a frequency versus time pattern for generation of LIDAR data is labeled ld and corresponds to the outgoing LIDAR and the resulting system output signal being in a control stage.

The number of control chirp segments in each cycle of the control stage can be equal to the number of data chirp segments in the cycles of the data stage. As a result, the control chirp segments in each cycle of the control stage can each be associated with one of the data chirp segments in the cycles of the data stage. The period indices can be chronologically assigned with the cycles. As a result, each data chirp segment and the associated control chirp segment can be associated with the same period index. Accordingly, each control chirp segment can be represented by $RP_k$ and the data chirp segments can be represented by $DP_k$ where k represents the period index for the data chirp segment associated with the control chirp segment. The control chirp segment and the data chirp segment having the same period index are associated with one another. In FIG. 9A, the duration of each control chirp segment is labeled $RP_k$. Corresponding control chirp segments in different cycles are associated with the same control chirp segment index. For the purposes of illustration, the duration of each control chirp segment is shown as being equal to the duration of the associated data chirp segment.

A control chirp segment bandwidth can be the magnitude of the frequency change of the system output signal used for generation of the modified light source control signals during a control chirp segment. For instance, the control chirp segment bandwidth during the control chirp segment $RP_1$ is labeled $BW_{sc}$ in FIG. 9A. Since the system output signals include light from the outgoing LIDAR signal and the LIDAR output signal, the outgoing LIDAR signal and the LIDAR output signal also exhibit the control chirp segment bandwidths. Although the control chirp segment bandwidth is shown as being constant across the control chirp segments, the control chirp segment bandwidth can be the same or different in different control chirp segments. A data chirp segment bandwidth can be the magnitude of the frequency change of the system output signal used for generation of LIDAR data during a data chirp segment. For instance, the data chirp segment bandwidth during the data chirp segment $DP_1$ is labeled $BW_{ld}$ in FIG. 9A. Although the data chirp segment bandwidth is shown as being constant across the data chirp segments, the control chirp segment bandwidth can be the same or different in different data chirp segments. Since the system output signals include light from the outgoing LIDAR signal and the LIDAR output signal, the outgoing LIDAR signal and the LIDAR output signal also exhibit the data chirp segment bandwidths.

The control chirp segment bandwidths can be selected so they are larger than the associated data chirp segment bandwidths. For instance, all or a portion of the control chirp segment bandwidths can each exceed the data chirp segment bandwidth of the data chirp segment associated with the control chirp segment. In some instances, each of the control chirp segment bandwidths is larger than at least one of the data chirp segment bandwidths. The range of frequencies in the control chirp segment bandwidths can overlap the range of frequencies in the associated data chirp segment bandwidths. For instance, all or a portion of the control chirp segment bandwidths can each have a range of frequencies that overlaps the range of frequencies in the associated data chirp segment bandwidths. Although FIG. 9A illustrates the control chirp segment bandwidths overlapping the upper and lower end of the range of frequencies in the associated data chirp segment bandwidths, all or a portion of the control chirp segment bandwidths can each overlap the upper end of the range of frequencies in the associated data chirp segment bandwidth without extending beyond the lower end of the range of frequencies in the associated data chirp segment bandwidth. Additionally, or alternately, all or a portion of the control chirp segment bandwidths can each overlap the lower end of the range of frequencies in the associated data chirp segment bandwidth without extending beyond the upper end of the range of frequencies in the associated data chirp segment bandwidth. The range of frequencies in all or a portion of the control chirp segment bandwidths can each include the full range of frequencies in the associated data chirp segment bandwidth. As an example, all or a portion of the control chirp segment bandwidths can each have a range of frequencies that encompasses the range of frequencies the associated data chirp segment bandwidth. In some instances, each of the control chirp segment bandwidths has a range of frequencies that includes the full range of frequencies in the associated data chirp segment bandwidths. In some instances, all or a portion of the control chirp segments each has a control chirp segment bandwidth that is more than 100%, 120%, or 200% and/or less than 500%, or 1000% of the associated data chirp segment bandwidth. The duration of each control chirp segment can be equal to the duration of the associated data chirp segment.

Figure 9B:
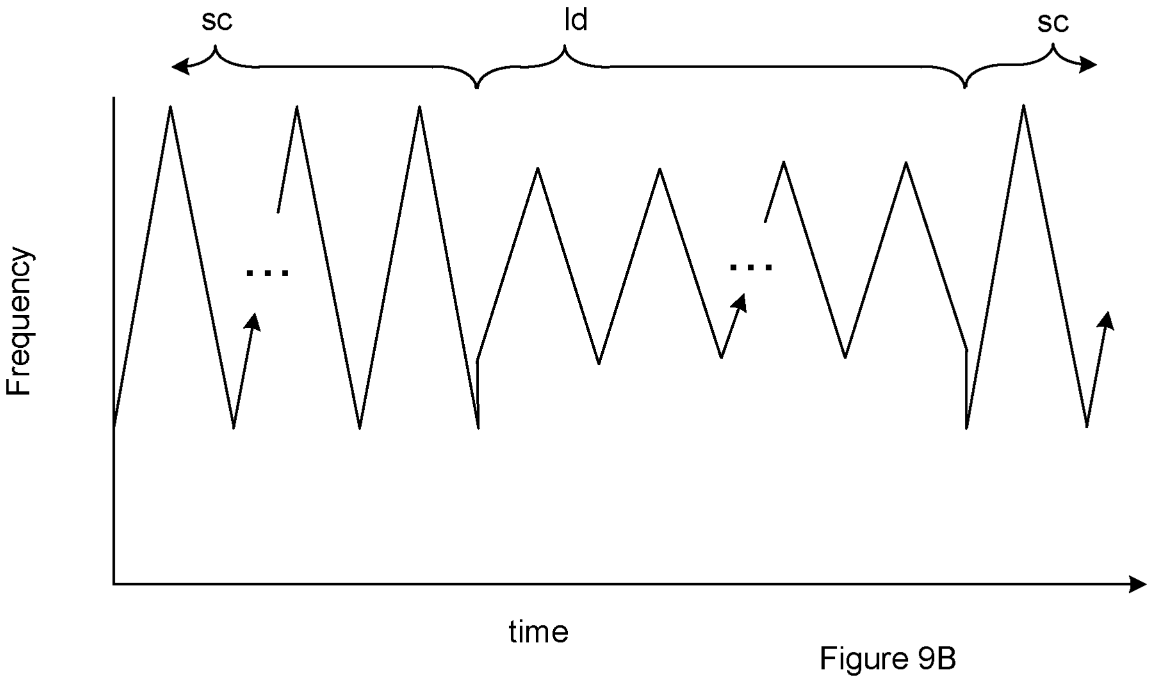
FIG. 9B illustrates the frequency versus time pattern for an outgoing LIDAR signal having data stages in series with control stages.

The light source controller 342 can operate the light source such that the outgoing LIDAR signals and any resultant system output signals are serially in the control stage and the data stage. For instance, FIG. 9B illustrates the frequency versus time pattern for an outgoing LIDAR signal and accordingly the resulting system output signal that includes light from the outgoing LIDAR signal. The time where the outgoing LIDAR signal is in the control stage (labeled sc) occur serially with the portion of the time that the system output signal is in the data stage (labeled ld). In some instances, an outgoing LIDAR signal and the resulting system output signal repeatedly alternates the time where the outgoing LIDAR signal is in the control stage (labeled sc) and the time that the system output signal is in the data stage (labeled ld).

The LIDAR system can optionally include one or more light signal amplifiers in addition, or as an alternative, to any amplifiers 110 and any amplifiers 320. For instance, an amplifier 390 can optionally be positioned along a first data line 228 and/or a second data line 232 as illustrated in FIG. 5B and FIG. 5E. Suitable amplifiers 390 for use on the LIDAR chip, include, but are not limited to, Semiconductor Optical Amplifiers (SOAs) and transimpedance amplifiers.

Figure 10:
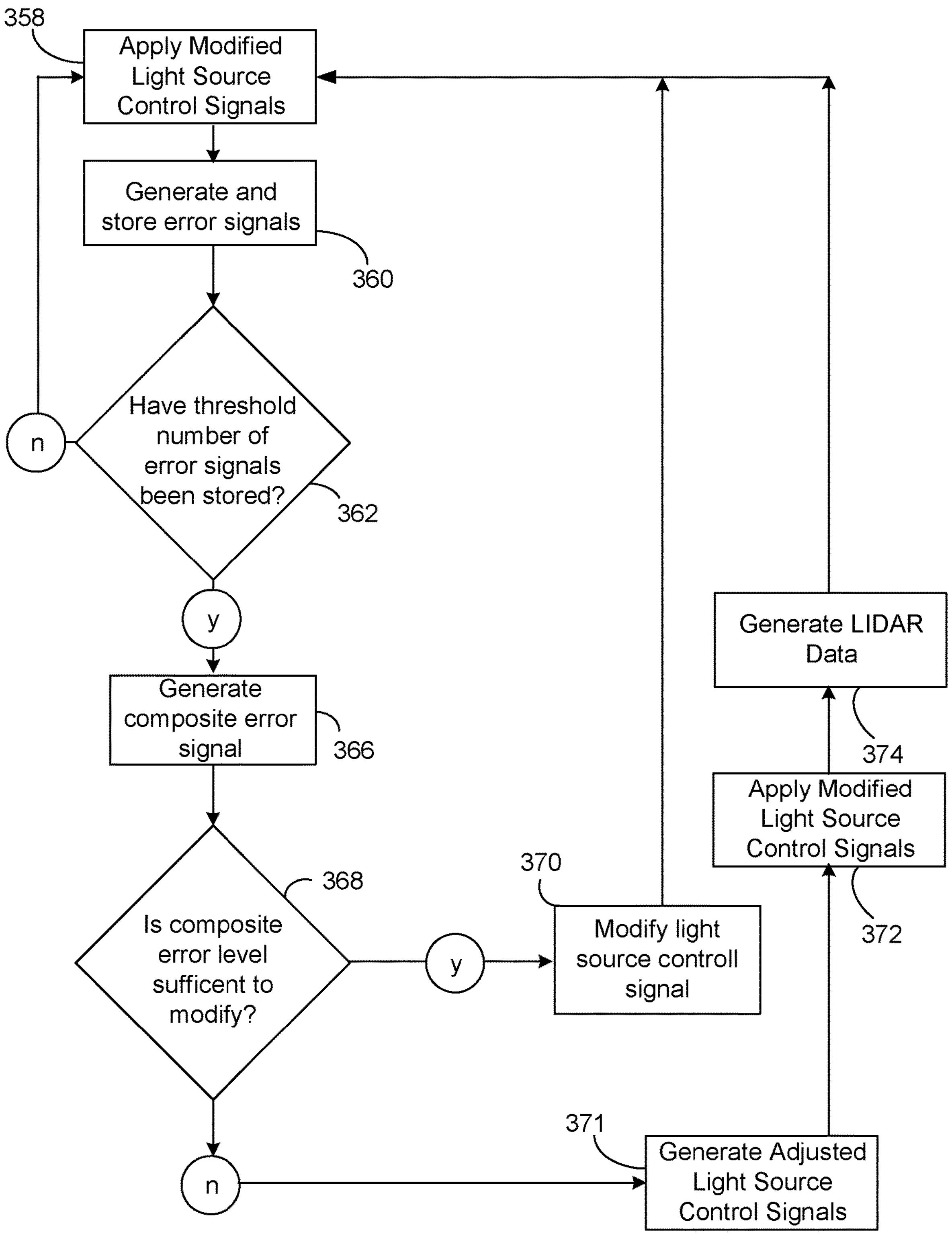
FIG. 10 is a process flow for a method of operating the LIDAR system.

FIG. 10 is a process flow method of operating a LIDAR system. Before generation of the LIDAR data, the outgoing LIDAR signal can be placed in the control stage. At process block 358, during each of the control chirp segments, the associated modified light source control signal is applied to the light source such that the modified light source control signals each acts as a light source control signal. For instance, the light source controller 342 can apply analog versions of the modified light source control signals to the light source such that the modified light source control signals each acts as a light source control signal. Under some conditions, all or a portion of the modified light source control signals may not be available as can occur upon start-up of LIDAR system operation. An initial light source control signal can be stored in a stored device such as storage device 344. When a modified light source control signal is not available to the light source controller 342 for one or more of the control chirp segments, the initial light source control signal associated with the control chirp segment can be applied to the light source as the modified light source control signal for that control chirp segment. The initial light source control signals can be determined theoretically to provide the desired frequency versus time pattern during the control stage. Alternately, the initial light source control signals can be experimentally determined to provide the desired frequency versus time pattern during the control stage.

At process block 360, the error signals generated from application of the modified light source control signals to the light source can be stored in a storage device such as storage device 344. The error signals can be generated for one or more different period indices where each of the error signals is associated with one of the period indices. For instance, the electronics can generate the error signals as disclosed in the context of FIG. 6B through FIG. 8 with the control chirp segments of the control stage serving as the data chirp segments.

At determination block 362, the error signal generator 330 can determine whether a threshold number of error signals that are associated with the same period index have been stored. The determination can be made for all or a portion of the period indices. In response to a negative determination for any of the period indices, the error signal generator 330 can return to process block 358. When the determination is positive for each of the period indices, each of the period indices for which the determination is positive can serve as a subject period index. The threshold number for different period indices can be the same or different. An example of suitable threshold numbers includes, but is not limited to, threshold numbers greater than or equal to 1, or 2.

In response to a positive determination at determination block 362, the error signal generator 330 can proceed to process block 366 from process block 362. At process block 366, the error signal generator 330 can generate the composite error signal for each of the subject period indices. In some instances, the composite error signals are generated as disclosed in the context of FIG. 6B through FIG. 8. The error signal generator 330 can optionally store the composite error signal for each of the subject period indices in the storage device.

The error signal generator 330 can proceed to determination block 368 from process block 366. At determination block 368, for each of the subject period indices, the error signal generator 330 and/or control signal generator 340 can determine whether a level of error indicated by a composite error signal generated at process block 336 is sufficient to generate a modified light source control signal for that subject period index. For instance, for each of the subject period indices, the error signal generator 330 and/or control signal generator 340 can determine whether a level of error indicated by the composite error signal generated at process block 336 is above an error threshold. As an example, for each of the subject period indices, the error signal generator 330 can determine whether the root mean square of the composite error signal generated at process block 336 is above an error threshold. When the determination is positive for one or more of the subject period indices, each of the subject period indices for which the determination is positive can serve as an erroneous subject period index. When the determination is positive for one or more of the subject period indices, the error signal generator 330 and/or control signal generator 340 can proceed to process block 370 where the error signal generator 330 and/or control signal generator 340 can generate a modified light source control signal for each of the erroneous subject period indices. In some instances, the modified light source control signal is generated as disclosed in the context of FIG. 6B through FIG. 8. The process flow returns to process block 358 from process block 370. At process block 358, any modified light source control signal associated with a period index that is not an erroneous subject period index remains as a modified light source control signal. However, each of the modified light source control signals generated at process block 370 is associated with an erroneous subject period index and replaces the prior modified light source control signal associated with the erroneous subject period index. The error signal generator 330 then applies the modified light source control signals to the light source as light source control signals.

When the determination at determination block 368 is negative for each of the subject period indices, the process can proceed to process block 371 from process block 368. At process block 371, an adjusted light source control signal can be generated from each of the modified light source control signals. For instance, each modified light source control signal can be multiplied by an adjustment factor to generate an adjusted light source control signal. As an example, when a modified light source control signal has the form illustrated in the context of FIG. 6H or FIG. 7D, the error signal generator 330 and/or control signal generator 340 can multiply each of the voltage levels labeled $V_m$ by the adjustment factor. Accordingly, the error signal generator 330 and/or control signal generator 340 can include a multiplier configured to multiply the modified light source control signal by the adjustment factor. Suitable multipliers include, but are not limited to, multipliers greater than or equal to 0.05 and less than 0.95.

Multiplication of the modified light source control signal by the adjustment factor can scale the modified light source control signal from the control chirp segment bandwidths to the data chirp segments bandwidth. As a result, the adjustment factor can be selected to scale each modified light source control signal to the bandwidth of the associated data chirp segment. For instance, multiplication of the modified light source control signal by the adjustment factor allows the modified light source control signal generated using the control chirp segment bandwidths to be applied to the light source during a data stage such that the outgoing LIDAR signal has data chirp segment bandwidths.

Other approaches can be used to calculate an adjusted light source control signal. For instance, the error signals or the composite error signal can be multiplied by the adjustment factor during the generation of the modified light source control signal so as to provide a modified light source control signal that can serve as an adjusted light source control signal. In another example, the analog version of the modified light source control signal can be multiplied by the adjustment to generate an adjusted light source control signal.

The adjustment factors can be the same or different for period indices. The value of the adjustment factors can be experimentally determined. For instance, the value of the adjustment factor can be determined through an iterative process. In some instances, the adjustment factor has a value less than 1.0. In some instances, the adjustment factor has a value in a range of 0.05 to 0.9.

In some instances, the modified light source control signal serves as the adjusted light source control signal. For instance, in some instances, the error signals, the composite error signal, the modified light source control signal and the analog version of the modified light source control signal are not multiplied by an adjustment factor and the modified light source control signal serves as the adjusted light source control signal.

The process flow proceeds to process block 372 from process block 371. At process block 372, the light source controller can apply the adjusted light source control signal to the light source so as to place the outgoing LIDAR signal in the data stage. For instance, during the data chirp segments of the data stage, the light source controller 342 can apply to the light source an analog version of the adjusted light source control signal associated with the data chirp segment. Accordingly, each of the adjusted light source control signals serves as one of the light source control signals. Since the system output signal includes light from the outgoing LIDAR signal, the system output signal is also in the data stage.

The process flow proceeds to process block 374 from process block 372. At process block 374, the LIDAR data can be generated from the composite signals that include light from the system output signal in the data stage. Accordingly, the LIDAR data is generated from the outgoing LIDAR signal in the data stage and from the resultant system output signal in the data stage.

The data stage can be discontinued in response to the presence of stage change conditions are present. As a result, the generation of LIDAR data at process block 374 can be discontinued or altered in response to the occurrence of stage change conditions. For instance, the light source controller 342 can change between the control stage of operation and the data stage of operation in response to stage change conditions. In many LIDAR systems, there are conditions where the generation of LIDAR data is difficult, impossible, less effective and/or less efficient. As an example, the beam scanner can be a polygon mirror that rotates around an axis such as a square shaped polygon mirror with four reflecting facets. The generation of LIDAR data becomes ineffective and/or less efficient when the outgoing LIDAR signal is incident on an edge of the polygon mirror. Additionally, the generation of LIDAR data becomes more effective and/or more efficient when the outgoing LIDAR signal is incident on a face of the polygon mirror. As a result, the light source controller 342 can operate the LIDAR system such that the outgoing LIDAR signal and the resulting system output signal are in the control stage when the outgoing LIDAR signal is incident on an edge of the polygon mirror but is in the data stage when the outgoing LIDAR signal is incident on a face of the polygon mirror. In another example, a square shaped polygon mirror can be arranged relative to the outgoing LIDAR signal such that the generation of LIDAR data becomes ineffective and/or less efficient as the angle of incidence of the outgoing LIDAR signal on a face of the polygon mirror approaches 45° and −45° and become more effective and/or more efficient as the angle of incidence of the outgoing LIDAR signal on a face of the polygon mirror approaches 0.0°. As a result, the outgoing LIDAR signal and the resulting system output signal can be in the data stage when the angle of incidence of the outgoing LIDAR signal on a face of the polygon mirror is between $-\theta$ and $\theta$ (such as −44° and) 44° and is in the control stage when the outgoing LIDAR signal has an angle of is incident on the face of the polygon mirror is outside of the range from $-\theta$ and $\theta$. Suitable values of $\theta$ include but are not limited to, angles greater than or equal to 30°, 44° and less than or equal to 90°. The polygon mirror passing through the angles $-\theta$ and $\theta$ can serve as an example of stage change conditions. Other examples of stage change conditions include, but are not limited to, passage of a programmed period of time.

The outgoing LIDAR signal can be returned to the control stage in response to the occurrence of stage change conditions at process block 374. For instance, the process can return to process block 358 from process block 374 in response to the occurrence of stage change conditions. At process block 358, during each of the control chirp segments, the associated modified light source control signal can be applied to the light source such that the modified light source control signals each acts as a light source control signal. As an example, during each control chirp segment, the error signal generator 330 can apply the analog version of the associated modified light source control signal to the light source. When the process reaches process block 358 from process block 374, the modified light source control signals can be modified light source control signals that were previously application. For instance, when the process reaches process block 358 from process block 374, the modified light source control signals can be the modified light source control signals present at the end of the prior control stage. As an example, the modified light source control signals can be the modified light source control signals that were present when the determination at determination block 368 was made last. Accordingly, the modified light source control signals can be stored and updated during the process flow. As is evident from the above discussion, the modified light source control signals are applied to the light source during the control stage and the adjusted light source control signals are applied to the light source during the data stage.

In response to the initiation of a control stage in the outgoing LIDAR signal (sc) and/or in response to the generation of one or more new modified light source control signals, the storage device can be cleared for storage of a set of error signals for each of the control chirp segments that serves as a subject period. For instance, at process block 358, the error signal generator 330 can clear the storage device for storage of a set of error signals for each of the control chirp segments that serves as a subject period. After clearing the storage device for storage of the set of error signals, the error signal generator 330 can generate error signals and store the error signals in the storage device 344 as disclosed in the context of process block 360 of FIG. 10. As a result, error signals stored during the execution of FIG. 10 are generated from outgoing LIDAR signals in the control stage (sc). The electronics can optionally stop generation of the control signals in response to the outgoing LIDAR signal changing from the control stage to the data stage. In the next data stage after a control stage where adjusted light source control signals generated, the newly generate adjusted light source control signals are applied to the light source during the data chirp segments that are associated with the adjusted light source control signal. For instance, each of the adjusted light source control signals is associated with one of the control chirp segments. The adjusted light source control signals are applied to the light source during the associated data chirp segments. As an example, the adjusted light source control signal associated with a control chirp segment can be applied to the light source during the data chirp segments that are also associated with that control chirp segment.

The error signals can be stored and/or generated from an outgoing LIDAR signal in the control stage (sc). In some instances, the LIDAR system continues to output system output signal and generate composite signals while the outgoing LIDAR signal is in the control stage (sc). As a result, in some instances, LIDAR data can continue to be calculated from composite signals generated while the system output signal is in the signal control stage (sc). Accordingly, in some instances, LIDAR data is calculated while the system output signal is in the signal control stage (sc). When higher frequencies are present in the system output signal and the distance between the LIDAR system and an object increases, the resulting beat frequencies can increase to a degree that degrades the ability of the LIDAR system to provide reliable LIDAR data results. As a result, all or a portion of the LIDAR data generated while the system output signal is in the signal control stage (sc) can be discarded and/or ignored. Accordingly, in some instances, LIDAR data is not calculated from outgoing LIDAR signals in the signal control stage (sc). As a result, in some instances, LIDAR data is not calculated from outgoing LIDAR signals and any resultant system output signals in the signal control stage (sc).

LIDAR data can be generated and/or stored from an outgoing LIDAR signal and the resulting system output signal in the data stage (ld). In some instances, the beating control signals continue to be generated while the system output signal is in the data stage (ld). As a result, in some instances, error signals can continue to be generated from the beating control signals that result from the outgoing LIDAR signal having the frequency versus time pattern for generation of LIDAR data (ld). However, higher quality modified light source control signals are generated using larger bandwidths. As a result, higher quality modified light source control signals are generated from the frequency versus time pattern for generation of modified light source control signals (sc) than are generated from the frequency versus time pattern for generation of LIDAR data (ld). Accordingly, in some instances, error signals and/or modified light source control signals are not generated from the beating control signals that result from the outgoing LIDAR signal having the frequency versus time pattern for generation of LIDAR data (ld). In some instances, error signals and/or modified light source control signals are generated from an outgoing LIDAR signal in the data stage (ld) but are not applied to the light source or to a light source control signal. For instance, in some instances, error signals and/or modified light source control signals are generated from the beating control signals that result from an outgoing LIDAR signal in the data stage (ld) but the light source controller 342 does not apply an analog version of an adjusted light source control signals to the light source as described in the context of process block 372 of FIG. 10. Error signals and/or adjusted light source control signals generated and/or stored from an outgoing LIDAR signal in the data stage (ld) can be replaced by error signals and/or modified light source control signals generated and/or stored while the outgoing LIDAR signal is in the control stage (sc). The modified light source control signals or adjusted light source control signals generated and/or stored from an outgoing LIDAR signal in the control stage (sc) can be applied to the light source or to a light source control signal.

The electronics 32 disclosed in the context of FIG. 6A through FIG. 10 can include components in addition to the illustrated components. As one example, the electronics 32 disclosed in FIG. 6E, FIG. 6E, and FIG. 7A can include a beat frequency identifier 238 in addition to the illustrated components.

Suitable electronics 32 can include an electronic controller that includes or consists of analog electrical circuits, digital electrical circuits, Application Specific Integrated Circuits (ASICs), processors, microprocessors, digital signal processors (DSPs), Field Programmable Gate Arrays (FPGAs), computers, microcomputers, or combinations suitable for performing the operation, monitoring and control functions described above. In some instances, the electronics 32 include one or more storage devices that store instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

A phase detector 332 such as disclosed in the context of FIG. 6C can be or include an Application Specific Integrated Circuits (ASICs), Field Programmable Gate Arrays (FPGAs), digital signal processor (DSP), or microprocessor. An analog phase detector 332 can execute the attributed functions using discrete or analog integrated circuits. A digital phase detector 332 such as disclosed in the context of FIG. 6E can be an Application Specific Integrated Circuits (ASICs), Field Programmable Gate Arrays (FPGAs), digital signal processor (DSP), microprocessor. A digital phase detector 332 can execute the attributed functions using time-to-digital converters or other digital implementations.

An analog control signal generator 340 such as disclosed in the context of FIG. 6C can be or include an Application Specific Integrated Circuits (ASICs), and/or discrete electronics. A digital control signal generator 340 such as disclosed in the context of FIG. 6E can be or include an Application Specific Integrated Circuits (ASICs), Field Programmable Gate Arrays (FPGAs), digital signal processor (DSP), microprocessor.

A light source controller 342 such as disclosed in the context of FIG. 6C can be or include an Application Specific Integrated Circuits (ASICs), or discrete electronics. In some instances, an analog light source controller 342 executes the attributed functions using a digital-to-analog converter, a transconductor amplifier, current-mode digital-to-analog converter and combinations thereof.

An error signal generator 330 such as disclosed in the context of FIG. 7A can be or include a controller, processor, or microprocessor, Application Specific Integrated Circuits (ASICs), Field Programmable Gate Arrays (FPGAs), digital signal processor (DSP). In some instances, a digital error signal generator 330 executes the attributed functions using time-to-digital converter, or other implementations using digital gates.

Figure 11:
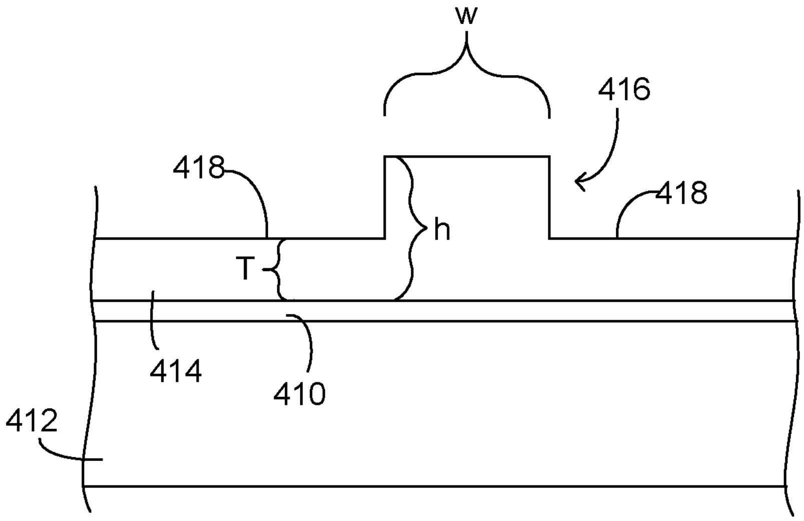
FIG. 11 is a cross-section of portion of a LIDAR chip that includes a waveguide on a silicon-on-insulator platform.

Suitable platforms for the LIDAR chips include, but are not limited to, silica, indium phosphide, and silicon-on-insulator wafers. FIG. 11 is a cross-section of a portion of a chip constructed from a silicon-on-insulator wafer. A silicon-on-insulator (SOI) wafer includes a buried layer 410 between a substrate 412 and a light-transmitting medium 414. In a silicon-on-insulator wafer, the buried layer 410 is silica while the substrate 412 and the light-transmitting medium 414 are silicon. The substrate 412 of an optical platform such as an SOI wafer can serve as the base for the entire LIDAR chip. For instance, the optical components shown on the LIDAR chips of FIG. 1A through FIG. 1C can be positioned on or over the top and/or lateral sides of the substrate 412.

The portion of the LIDAR chip in FIG. 11 includes a waveguide construction that is suitable for use in LIDAR chips constructed from silicon-on-insulator wafers. A ridge 416 of the light-transmitting medium extends away from slab regions 418 of the light-transmitting medium. The light signals are constrained between the top of the ridge 416 and the buried oxide layer 410.

The dimensions of the ridge waveguide are labeled in FIG. 11. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 μm and less than 4 μm, the ridge height (labeled h) is greater than 1

μm and less than 4 μm, the slab region thickness is greater than 0.5 μm and less than 3 μm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally, or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 μm and less than 0.5 μm. While the above dimensions will generally provide the straight or substantially straight portions of a waveguide with a single-mode construction, they can result in the tapered section(s) and/or curved section(s) that are multimode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction disclosed in the context of FIG. 11 is suitable for all or a portion of the waveguides on LIDAR chips constructed according to FIG. 1A through FIG. 1C.

Figure 12:
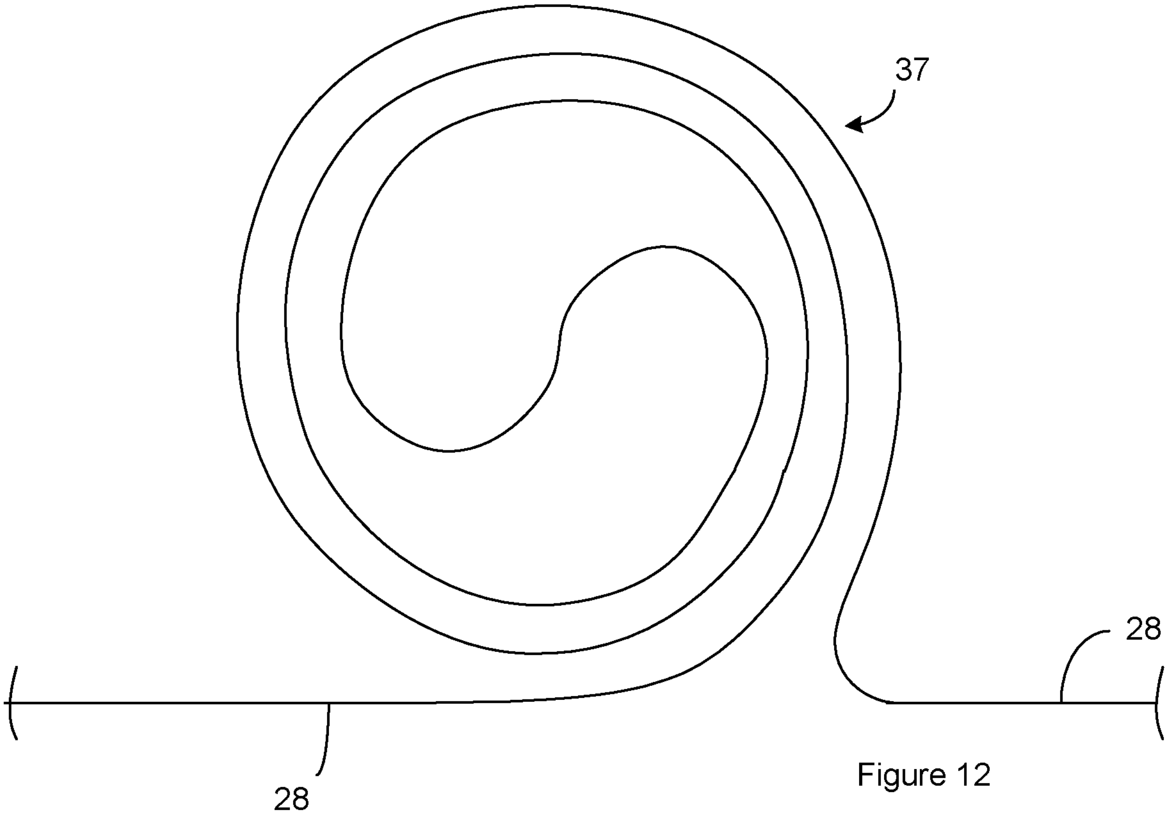
FIG. 12 is a topview of a portion of a waveguide that includes a spiral waveguide.

As noted above, the control waveguide 28 can include a delay section 37 that can be used to increase the length of the control waveguide 28. The delay section 37 can represent a spiral arrangement of the control waveguide 28. The spiral arrangement is selected to reduce the amount of space occupied by a longer waveguide. FIG. 12 illustrates a portion of a control waveguide 28 having a spiral arrangement. Near the center of the spiral arrangement, the waveguide turns back upon itself. Although the spiral arrangement is shown in a geometry that approximates a circle, the spiral arrangement can be in other geometries such as shapes that approximate an oval, rectangle or triangle. As a result, the spiral arrangement can include straight waveguide segments and/or substantially straight waveguide segments.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor 218, the second light sensor 220, the first light sensor 223, the second light sensor 224, first light sensor 298, and the second light sensor 300.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108,472, issued on Aug. 22, 2000 each of which is incorporated herein in its entirety. The use of light sensors that are integrated with the chip are suitable for all or a portion of the light sensors selected from the group consisting of the auxiliary light sensor 218, the second light sensor 220, the first light sensor 223, the second light sensor 224, the second light sensor 224, first light sensor 298, and the second light sensor 300.

The light source 4 that is interfaced with the utility waveguide 12 can be a laser chip that is separate from the LIDAR chip and then attached to the LIDAR chip. For instance, the light source 4 can be a laser chip that is attached to the chip using a flip-chip arrangement. Use of flip-chip arrangements is suitable when the light source 4 is to be interfaced with a ridge waveguide on a chip constructed from silicon-on-insulator wafer. Alternately, the utility waveguide 12 can include an optical grating (not shown) such as a Bragg grating that acts as a reflector for an external cavity laser. In these instances, the light source 4 can include a gain element that is separate from the LIDAR chip and then attached to the LIDAR chip in a flip-chip arrangement. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23, 1999; each of which is incorporated herein in its entirety. When the light source 4 is a gain element or laser chip, the electronics 32 can change the frequency of the outgoing LIDAR signal by changing the level of electrical current applied to through the gain element or laser cavity.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demultiplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demultiplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:

a LIDAR system having a light source that output an outgoing LIDAR signal, the LIDAR system configured to transmit a system output signal that includes light from the outgoing LIDAR signal; and the LIDAR system including a light source controller configured to operate the light source such that the outgoing LIDAR signal has a frequency versus time pattern with a control stage and a data stage, the frequency versus time pattern during the data stage having multiple data chirp segments repeated in cycles, the frequency versus time pattern during the control stage having multiple control chirp segments repeated in second cycles, each of the control chirp segments being associated with one of the data chirp segments, and a bandwidth of the outgoing LIDAR signal during each one of at least a portion of the control chirp segments being larger than the bandwidth of the outgoing LIDAR signal during the associated data chirp segment.

2. The system of claim 1, wherein the data stage follows the control stage.

3. The system of claim 1, wherein the data stage is one of multiple data stages in the frequency versus time pattern of the outgoing LIDAR signal and the control stage is one of multiple control stages in the frequency versus time pattern of the outgoing LIDAR signal and the data stages are alternated with the control stages in the frequency versus time pattern of the outgoing LIDAR signal.

4. The system of claim 1, wherein a frequency of the outgoing LIDAR signal is chirped in each of the control chirp segments and during each of the data chirp segments.

5. The system of claim 4, wherein the bandwidth of each of the control chirp segment is larger than the bandwidth of the associated data chirp segment.

6. The system of claim 4, wherein a rate and/or direction of the chirp is different in different control chirp segments of the same cycle and the rate and/or direction of the chirp is different in different data chirp segments of the same cycle.

7. The system of claim 1, wherein a range of frequencies in each of the bandwidths that is larger than the bandwidth of the associated data chirp segment includes the range of frequencies in the bandwidth of the associated data chirp segment.

8. The system of claim 1, wherein a range of frequencies in each of the bandwidths that is larger than the bandwidth of the associated data chirp segment overlaps the range of frequencies in the bandwidth of the associated data chirp segment.

9. The system of claim 1, wherein each of the bandwidth that is larger than the bandwidth of the associated data chirp segment is more than 160% of the bandwidth of the associated data chirp segment.

10. The system of claim 1, wherein the LIDAR system is configured to receive system return signals that each includes light from the system output signal after the system output signal was reflected by an object located outside of the LIDAR system, and the LIDAR system including a light combiner configured to combine light from the system returns signal with light from a reference signal so as to generate a composite light signal beating at a beat frequency, the reference signal including light from the outgoing LIDAR signal.

11. The system of claim 10, wherein the LIDAR system includes a LIDAR data generator configured to calculate LIDAR data from the beat frequency of the composite signal when the composite signal includes light from the outgoing LIDAR signal having the frequency versus time pattern in the data stage, the LIDAR data indicating a radial velocity and/or distance between the LIDAR system and the object.

12. The system of claim 10, wherein the LIDAR data generator is configured to refrain from calculation of the LIDAR data when the composite signal includes light from the outgoing LIDAR signal having the frequency versus time pattern in the control stage.

13. The system of claim 1, wherein the LIDAR system includes a control signal generator configured to generate a light source control signal from the outgoing LIDAR signal in the control stage, and the light source controller being configured to apply the light source control signal to the light source when the outgoing LIDAR signal in the control stage, the light source control signal being applied to the light source so as to provide the outgoing LiDAR signal with the frequency versus time pattern of the data stage.

14. The system of claim 1, wherein the light source controller is configured to apply the light source control signal to the light source such that the frequency versus time pattern is in the data stage.

15. A method of operating a system, comprising:

causing a light source in a LIDAR system to output an outgoing LIDAR signal, the LIDAR system being configured to transmit a system output signal that includes light from the outgoing LIDAR signal; and operating the light source such that the outgoing LIDAR signal has a frequency versus time pattern with a control stage and a data stage, the frequency versus time pattern during the data stage having multiple data chirp segments repeated in cycles, the frequency versus time pattern during the control stage having multiple control chirp segments repeated in second cycles, each of the control chirp segments being associated with one of the data chirp segments, and a bandwidth of the outgoing LIDAR signal during each one of at least a portion of the control chirp segments being larger than the bandwidth of the outgoing LIDAR signal during the associated data chirp segment.

16. The method of claim 15, wherein the data stage follows the control stage.

17. The method of claim 15, wherein the data stage is one of multiple data stages in the frequency versus time pattern of the outgoing LIDAR signal and the control stage is one of multiple control stages in the frequency versus time pattern of the outgoing LIDAR signal and the data stages are alternated with the control stages in the frequency versus time pattern of the outgoing LIDAR signal.

18. The method of claim 15, wherein a frequency of the outgoing LIDAR signal is chirped in each of the control chirp segments and during each of the data chirp segments.

19. The method of claim 18, wherein the bandwidth of each of the control chirp segment is larger than the bandwidth of the associated data chirp segment.

20. The system of claim 18, wherein a rate and/or direction of the chirp is different in different control chirp segments of the same cycle and the rate and/or direction of the chirp is different in different data chirp segments of the same cycle.

* * * * *